(12) United States Patent
Ishii

(10) Patent No.: US 8,600,187 B2
(45) Date of Patent: Dec. 3, 2013

(54) IMAGE RESTORATION APPARATUS AND IMAGE RESTORATION METHOD

(75) Inventor: Yasunori Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/499,733

(22) PCT Filed: Aug. 4, 2011

(86) PCT No.: PCT/JP2011/004426
§ 371 (c)(1),
(2), (4) Date: Apr. 2, 2012

(87) PCT Pub. No.: WO2012/017662
PCT Pub. Date: Feb. 9, 2012

(65) Prior Publication Data
US 2012/0195520 A1   Aug. 2, 2012

(30) Foreign Application Priority Data
Aug. 5, 2010   (JP) .................................. 2010-176790

(51) Int. Cl.
*G06K 9/40*   (2006.01)

(52) U.S. Cl.
USPC .......................................... 382/255; 382/254

(58) Field of Classification Search
USPC .................. 382/255, 254, 260–264
See application file for complete search history.

(56) References Cited

U.S. PATENT DOCUMENTS

| 7,580,620 | B2 | 8/2009 | Raskar et al. |
| 7,639,289 | B2 | 12/2009 | Agrawal et al. |
| 7,756,407 | B2 | 7/2010 | Raskar |
| 2006/0093233 | A1 | 5/2006 | Kano et al. |
| 2007/0258706 | A1 | 11/2007 | Raskar et al. |
| 2007/0258707 | A1 | 11/2007 | Raskar |
| 2008/0062287 | A1 | 3/2008 | Agrawal et al. |

(Continued)

FOREIGN PATENT DOCUMENTS

| JP | 2001-197357 | 7/2001 |
| JP | 2006-129236 | 5/2006 |

(Continued)

OTHER PUBLICATIONS

International Search Report issued Oct. 25, 2011 in International (PCT) Application No. PCT/JP2011/004426.

(Continued)

*Primary Examiner* — Yon Couso
(74) *Attorney, Agent, or Firm* — Wenderoth, Lind & Ponack, L.L.P.

(57) ABSTRACT

An image restoration apparatus reduces blur developed in an image generated by synthesizing a plurality of input images that are sequentially captured to stably prevent the development of ringing artifacts while reducing an increase in processing load. The apparatus includes: a PSF obtaining unit obtaining a first Point Spread Function (PSF) showing blurs which develop across input images; a PSF transforming unit processing the first PSF to generate a second PSF, so that, in a frequency domain, an amplitude value for each of frequencies is not smaller than a threshold value; an image converting unit converting the input images into multiple converted images based on portions of the second PSF and each corresponding to one of the input images; and an image restoring unit restoring a degraded image, into which the converted images are synthesized, to generate a restored image, the restoration being executed based on the second PSF.

11 Claims, 21 Drawing Sheets

(56) References Cited

U.S. PATENT DOCUMENTS

| | | | |
|---|---|---|---|
| 2008/0144900 A1* | 6/2008 | Li et al. | 382/130 |
| 2009/0027508 A1 | 1/2009 | Miki et al. | |
| 2011/0034176 A1* | 2/2011 | Lord et al. | 455/450 |

FOREIGN PATENT DOCUMENTS

| | | |
|---|---|---|
| JP | 2008-310797 | 12/2008 |
| JP | 2009-033292 | 2/2009 |
| JP | 2009-522825 | 6/2009 |
| JP | 2011-109619 | 6/2011 |
| WO | 2007/129762 | 11/2007 |
| WO | 2007/129766 | 11/2007 |

OTHER PUBLICATIONS

Qi Shan et al., "High-quality Motion Deblurring from a Single Image", SIGGRAPH 2008, Aug. 2008.

Kenichi Yoneji, Masayuki Tanaka, and Masatoshi Okutomi, "PSF Parameter Estimation for Restoration of Linear Motion Blurred Image", Technical Report of Information Processing Society of Japan, vol. 2005, No. 38, pp. 47-52, 2005. (English abstract).

Masayuki Tanaka et al., "Motion Blur Parameter Identification from a Linearly Blurred Image" IEEE 2007.

J. M. Bioucas-Dias, "Bayesian Wavelet-Based Image Deconvolution: A GEM Algorithm Exploiting a Class of Heavy-Tailed Priors", IEEE Trans. Image Proc., pp. 937-951, Apr. 2006.

Anat Levin, "Blind Motion Deblurring Using Image Statistics", Advances in Neural Information Processing Systems (NIPS), Dec. 2006.

Bob Fergus et al., "Removing Camera Shake from a Single Photograph", SIGGRAPH 2006, Jul. 2006.

Ramesh Raskar et al., "Coded Exposure Photography: Motion Deblurring using Fluttered Shutter", SIGGRAPH 2006, Jul. 2006.

Amit Agrawal et al., "Coded Exposure Deblurring: Optimized Codes for PSF Estimation and Invertibility", Mitsubishi Electric Research Laboratories, http://www.merl.com, Jun. 2009.

* cited by examiner

FIG. 4
(a) [111111111]
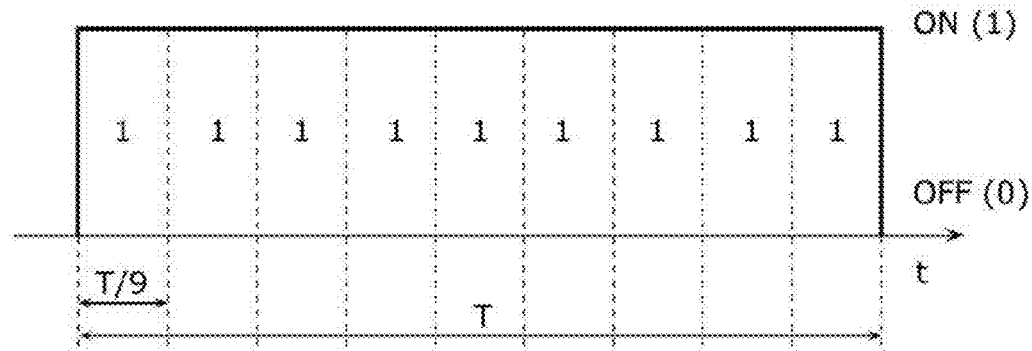
(b) [101101110]
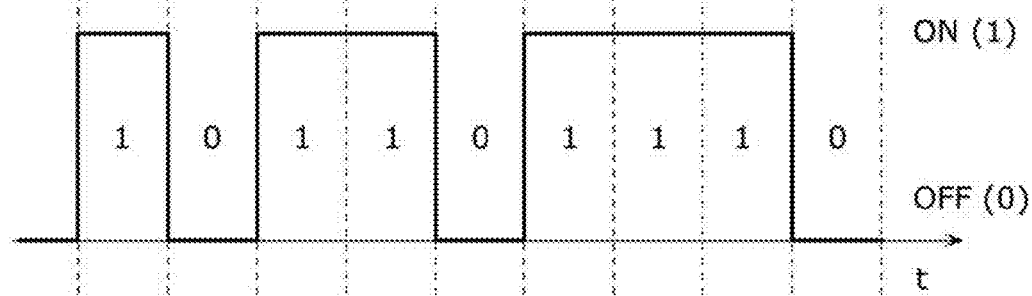
(c) [101101110]
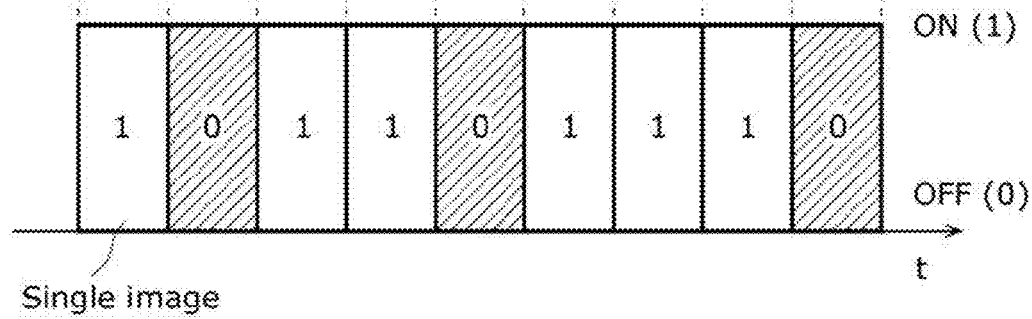
Single image FIG. 6
(a)
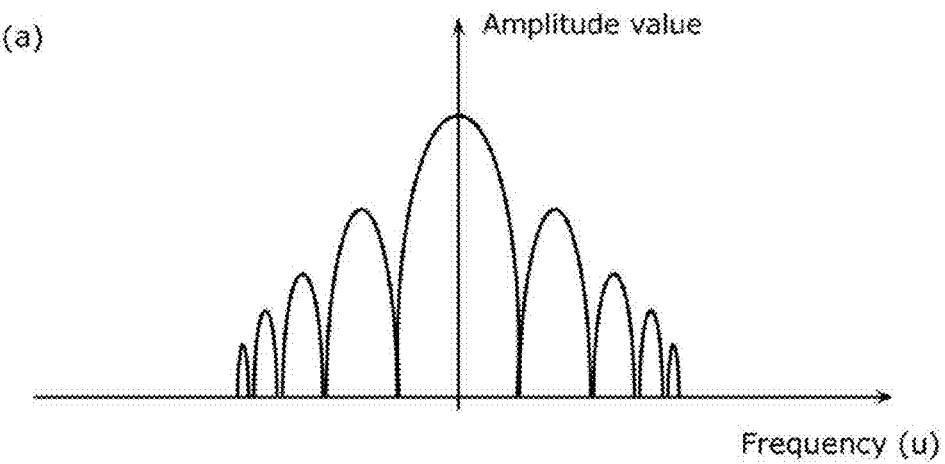
(b)
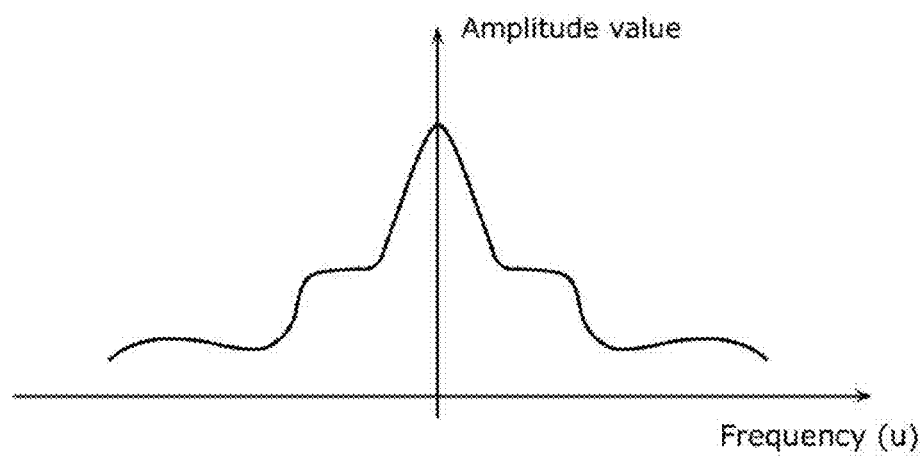

IMAGE RESTORATION APPARATUS AND IMAGE RESTORATION METHOD

TECHNICAL FIELD

The present invention relates to an image restoration apparatus which reduces a blur developed in an image generated by synthesizing a plurality of input images that are sequentially captured, and an image restoration method performed by the image restoration apparatus.

BACKGROUND ART

Images captured with digital cameras might have noise caused by the characteristics of readout circuits and transmission lines included in Charge-Coupled Devices (CCD) and Complementary Metal Oxide Semiconductors (CMOS).

Furthermore, such images might have out-of-focus blurs and camera shake blurs when captured. Thus, the images captured with a digital camera are degraded by noise due to characteristics peculiar to an imaging apparatus in combination with blurs due to the user's operations in capturing.

In the blurs, an image blur caused by camera shake is referred to as "motion blur" and a blur developed due to out of focus is referred to as "out-of-focus blur".

Recent increase in demand of high-sensitivity capturing requires the needs of restoring an image degraded by blurs (hereinafter referred to as "degraded image") to its original image (hereinafter referred to as "true image") as close as possible. Techniques required in high-sensitivity capturing for obtaining clear, noise-free, and blur-free images are roughly classified into twofold; the technique to enhance sensitivity and the technique to make the exposure time long.

In general, the noise increases as the sensitivity is enhanced. Thus, in the technique to enhance the sensitivity, signals are inevitably overwhelmed by the noise. Consequently, most of the image is affected by the noise.

In contrast, a longer exposure time allows much light from an object to be accumulated, and provides an image having little noise. Hence, the signals are not overwhelmed by the noise. The technique to make the exposure time long, however, causes a problem of camera shakes which develop on the image during the exposure time.

Hence, two techniques have been proposed to overcome the problem due to a longer exposure time. One of the techniques is optical deblurring which involves shifting a lens (See Patent Reference 1, for example). The other technique is to obtain the direction and the size of a blur from an obtained image, and to restore the image by signal processing based on the obtained direction and size of the blur (restoring by signal processing. See Patent Literatures 2 to 4 and Non-Patent Literatures 1 to 7, for example).

The exposure time could be made long in order to ensure sufficient light exposure in a dark environment; however, this would increase the risk of a greater camera shake. In order to overcome a blur using the optical deblurring in such a dark environment, the lens needs to be shifted in a greater a time delay when the lens shifts. Furthermore, there is a physical limit for making the shift range great.

The phenomenon that the camera shake degrades an image from a true image to a degraded image can be modeled below. A function representing luminance of each of pixels in the degraded image is obtained by the convolution of a function representing luminance of each of pixels in the true image with a point spread function representing the blur of the image. In contrast, deconvolution may be performed when the obtained degraded image is to be restored into the true image. The convolution is equivalent to multiplication in a frequency domain. Thus, the restored image is obtained when the degraded image is divided by the PSF in the frequency domain.

In the case where the PSF is assumed to be unknown, the restored image is relatively easily obtained by the deconvolution if the effect of the noise is ignored. In contrast, in the case where the PSF is assumed to be known, the PSF needs to be estimated from the degraded image in order to obtain the restored image.

One of the techniques to estimate the PSF is the sparse coding disclosed in, for example, Non-Patent Literature 1. First, the sparse cording involves obtaining a first restoration result from an initial PSF and a degraded image which are manually provided. Next, the technique involves estimating a PSF assumed to be closer to the true PSF based on the first restoration result and the degraded image, and adjusting the initial PSF using the estimated PSF. Then, the technique involves obtaining a second restoration result from the degraded image using the adjusted PSF. After that, the technique involves repeating the operation of obtaining the Nth restored image from the (N−1)th PSF and the degraded image, and of estimating the Nth PSF from the Nth restored image and the degraded image. Hence, the technique simultaneously achieves the estimation of the PSF and the restoration of the degraded image.

Unfortunately, the technique has a problem in that noise, such as ringing artifacts, develops in the restored image. The ringing artifacts are noise developed in the portion of an image with uniformed luminance (solid portion). The ringing artifacts do not make the solid portion look solid.

FIG. 1A shows an image whose luminance changes in jaggies (a true image near an edge). FIG. 1B depicts a graph which schematically shows a luminance distribution of the true image. FIG. 2A shows a degraded image (blurred image) found near the edge and obtained by a camera capturing the image in FIG. 1A. FIG. 2B depicts a graph which schematically shows a luminance distribution of the degraded image.

Assumed here is the case where a camera shake has developed in a horizontal direction when the image is captured. The degraded image in FIG. 2A has its edges blurred because of a camera shake.

FIG. 3A shows an image into which the degraded image in FIG. 2A is restored by signal processing. FIG. 3B depicts a graph which schematically shows a luminance distribution of the restored image. The restored image in FIG. 3A has a portion with the luminance is periodically varying. Such a luminance variation is the noise referred to "ringing artifacts". The ringing artifacts develop based on the fact that, in the frequency domain, there is a frequency (hereinafter referred to as "zero point") whose the amplitude value for the PSF becomes 0 or becomes unboundedly close to 0.

Techniques to solve such a ringing problem are disclosed in Patent References 3 and 4, and Non-Patent References 6 and 7. Rather leaving the shutter open for the entire exposure time, the techniques can reduce a frequency whose amplitude of the PSF becomes zero in the frequency domain, by obscuring light according to a predetermined temporal pattern (coding pattern). Accordingly, the ringing artifacts can be prevented. The techniques disclosed in Patent References 3 and 4, and in Non-Patent References 6 and 7 are referred to as "Coded Exposure Photography".

CITATION LIST

Patent Literature

[PLT 1]
Japanese Unexamined Patent Application Publication No. 2001-197357.
[PLT 2]
Japanese Unexamined Patent Application Publication No. 2006-129236.
[PLT 3]
Japanese Unexamined Patent Application Publication (Translation of PCT Application) No. 2009-522825.
[PLT 4]
Japanese Unexamined Patent Application Publication No. 2008-310797.

Non Patent Literature

[NPL 1]
"High-quality Motion Deblurring from a Single Image", Qi Shan, Jiaya Jia, and Aseem Agarwala, SIGGRAPH 2008.
[NPL 2]
"PSF Parameter Estimation for Restoration of Linear Motion Blurred Image", Kenichi Yoneji, Masayuki Tanaka, and Masatoshi Okutomi, Technical Report of Information Processing Society of Japan, vol. 2005, No. 38, pp. 47-52, 2005.
[NPL 3]
"Bayesian Wavelet-based Image Deconvolution: A Gem Algorithm Exploiting a Class of Heavy-tailed Priors", J. Bioucas-Dias, IEEE Trans. Image Proc., vol. 4, pp. 937-951, April 2006.
[NPL 4]
"Blind Motion Deblurring Using Image Statistics", A. Levin, Advances in Neural Information Processing Systems (NIPS), December 2006.
[NPL 5]
"Removing Camera Shake from a Single Image", Bob Fergus et al., Barun Singh Aaron Hertzmann, SIGGRAPH 2006
[NPL 6]
"Coded Exposure Photography: Motion Deblurring using Fluttered Shutter", Ramesh Raskar, Amit Agrawal, Fack Tumblin, SIGGRAPH 2006
[NPL 7]
"Coded Exposure Deblurring: Optimized Codes for PSF Estimation and Invertibility", Amit Agrawal, Yi Xu, Mitsubishi Electric Research Laboratories, http://www.merl.Com

SUMMARY OF INVENTION

Technical Problem

In the technique disclosed in Patent Literatures 3 and 4, and Non-Patent Literature 6, coded exposure can prevent the development of ringing artifacts in a restored image.

The techniques, however, have to have a coding pattern previously determined before capturing an image since encoding is performed by obscuring light in the capturing. Specifically, the coding pattern is previously determined based on a specific image affected by a camera shake. The determined coding pattern is applied to another scene. Thus, in some capturing scenes, the development of a zero point in a PSF cannot be prevented even though the predetermined coding pattern is applied. Accordingly, ringing artifacts could develop on the restored image. In other words, such techniques cannot stably prevent the development of the ringing artifacts.

The technique disclosed in Non-Patent Literature 7 involves representing a coding pattern in the form of a binary code, and searching multiple binary codes for the optimal binary code for restoration of the image. However, there are so many binary codes to be searched for that it is not realistic to calculate actually optimal coding patterns for all of the PSFs.

Specifically, in order to determine the optimal coding pattern for the restoration of the image, the technique in Non-Patent Reference 7 involves performing restoration while varying the coding patterns, measuring the amount of noise found in the restored image, and determining whether or not the optimal restoration is performed.

Hence, the technique in Non-Patent Literature 7 needs to repeat capturing and restoring an image many times in order to search for the optimal coding pattern. This inevitably results in an increase in the amount of processing for the coding pattern search, as well as in power consumption. Furthermore, there are so many coding patterns to be searched that the technique in Non-Patent Literature 7 involves conducting a search within a limited group of the coding patterns, instead of all the coding patterns. This causes a problem that the coding pattern searched for is not necessarily optimal performance-wise.

The present invention is conceived in view of the above problems and has an object to provide an image restoration apparatus which stably prevents the development of ringing artifacts while reducing an increase in processing load, and an image restoration method performed by the image restoration apparatus.

Solution to Problem

In order to achieve the above object, an image restoration apparatus according to an aspect of the present invention reduces a blur developed in an image generated by synthesizing a plurality of input images that are sequentially captured. The image restoration apparatus includes: a PSF obtaining unit which obtains a first Point Spread Function (PSF) showing blurs which develop across the input images; a PSF transforming unit which processes the first PSF to generate a second PSF, the processing being executed so that, in a frequency domain, an amplitude value for each of frequencies is not smaller than a threshold value; an image converting unit which converts the input images into a plurality of converted images based on portions (i) of the second PSF and (ii) each corresponding to one of the input images; and an image restoring unit which restores a degraded image, into which the converted images are synthesized, to generate a restored image, the restoration being executed based on the second PSF.

This feature makes it possible to process the first PSF showing blurs which develop across input images to generate the second PSF in which the amplitude value for each of the frequencies is equal to or greater than a threshold value in the frequency domain. Then, the feature allows each of the input images to be converted based on each portion of the second PSF. The converted input images are synthesized into an image. Such a synthesized image corresponds to a degraded image (hereinafter referred to as coded degraded image) obtained when the degraded image is coded so that no zero points develop in the PSF. In other words, the feature makes it possible to generate a degraded image which is coded so that no zero points develop in the PSF, and which adapts to the blurs that develop across the input images. Accordingly, the feature does not require a coding pattern to be determined in advance. This feature contributes to stably preventing the development of the ringing artifacts. Furthermore, the feature does not require restoration processing to be repeated for generating the degraded image which is coded so that no zero points develop in the PSF. Thus, the feature makes it possible to reduce the increase in processing load.

Preferably, the PSF transforming unit processes the first PSF by specifying a frequency at which an amplitude value for the first PSF is smaller than the threshold value in the frequency domain, and changing at the specified frequency the amplitude value to a predetermined value equal to or greater than the threshold value.

The feature makes it possible to change an amplitude value to generate the second PSF. Here, the amplitude value is changed in a frequency in which the amplitude value of the first PSF is smaller than a threshold value. Thus, the feature makes it possible to generate a coded degraded image which further adapts to the blurs that develop across the input images. In other words, the feature makes it possible to generate a restored image having fewer blurs.

Preferably, the predetermined value used for changing an amplitude value for a first frequency is greater than the predetermined value used for changing an amplitude value for a second frequency which is higher than the first frequency.

The feature successfully makes an amplitude value in the low frequency greater than that in the high frequency in a frequency whose amplitude is changed, which contributes to efficiently reducing noise; that is ringing artifacts, that develops in the Plow frequency domain.

Preferably, the predetermined value is determined to be smaller as noise appearing in the input images is greater.

This feature successfully reduces the problem of increasing noise on the restored image caused by the change in amplitude value.

Preferably, the threshold value used for specifying a first frequency is greater than the threshold value used for specifying a second frequency which is higher than the first frequency.

This feature can efficiently eliminate a small amplitude value, which causes the ringing artifacts, in the low frequency domain. Accordingly, the feature can efficiently reduce noise; that is ringing artifacts, which develops in the low frequency domain.

Preferably, the threshold value is determined to be smaller as noise appearing in the input images is greater.

This feature successfully reduces the problem of increasing noise on the restored image caused by the change in amplitude value.

Preferably, the image converting unit determines portions (i) of the second PSF and (ii) each temporally corresponding to one of the input images, based on times when a blur shown by the second PSF is detected and when each of the input images is captured, and to convert each of the input images based on the corresponding one of the determined portions.

This feature makes it possible to determine, more properly, portions of the second PSF each of which corresponding to one of the input images.

Preferably, the PSF transforming unit generates the second PSF by specifying a frequency in which an amplitude value for the first PSF is smaller than the threshold value in the frequency domain, generating an offset PSF in which the specified amplitude value for the frequency is equal to or greater than the threshold value, and adding the offset PSF to the first PSF.

This feature makes it possible to generate the second PSF, using an additional offset PSF.

The present invention may be implemented as an image restoration apparatus including the above-described characteristic processing units; instead, the present invention may also be implemented as an image restoration method including the characteristic processing units in the image restoration apparatus as steps. Moreover, the present invention may be implemented as a computer program causing a computer to execute each of the characteristic steps included in the image restoration method. As a matter of course, such a computer program may be distributed via a computer-readable storage medium such as a compact disc read only memory (CD-ROM), and a communications network such as the Internet.

Furthermore, the present invention may be implemented in a form of an integrated circuit having the characteristic processing units included in the image restoration apparatus.

Advantageous Effects of Invention

The present invention can generate, based on sequentially captured multiple input images, a degraded image which adapts to the blurs that develop across the input images. The degraded image is coded so that no zero points develop in the PSF. Accordingly, the present invention makes it possible to stably prevent the development of ringing artifacts while reducing an increase in processing load.

BRIEF DESCRIPTION OF DRAWINGS

FIG. 4 shows how coded exposure is performed.
FIG. 6 schematically shows the PSF transformed into a frequency domain.

DESCRIPTION OF EMBODIMENT

Embodiment

Figure 1A:
FIG. 1A shows a true image near an edge.
Figure 1B:
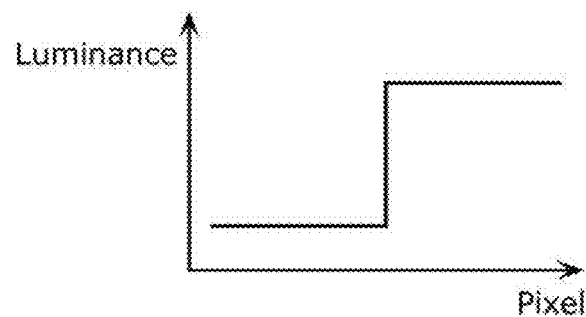
FIG. 1B depicts a graph which schematically shows a luminance distribution of the true image.
Figure 2A:
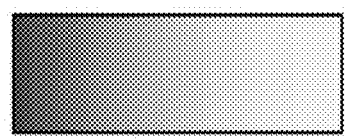
FIG. 2A shows a degraded image near an edge.
Figure 2B:
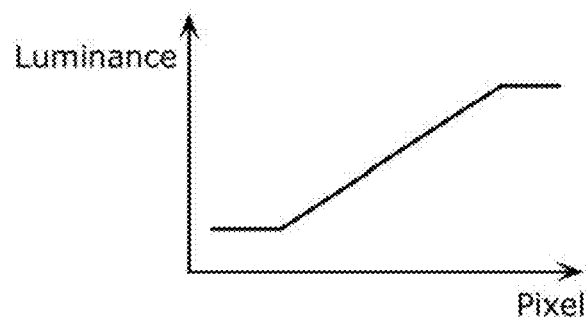
FIG. 2B depicts a graph which schematically shows a luminance distribution of the degraded image.
Figure 3A:
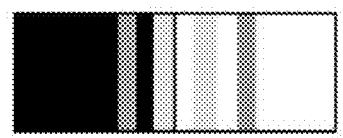
FIG. 3A shows an image into which the degraded image is restored by signal processing.
Figure 3B:
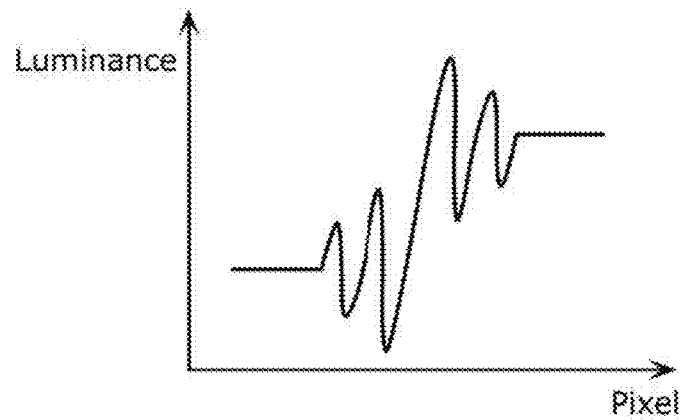
FIG. 3B depicts a graph which schematically shows a luminance distribution of the restored image.

Prior to describing the details of an embodiment of the present invention, outlined is the fundamental basis of an image restoration method according to the embodiment.

It is to be noted that m(x, y) denotes the luminance distribution of an image formed on an image plane. Coordinates (x, y) are two-dimensional coordinates showing the position of a pixel (photo censing cell) on the image plane. When x and y are integers which respectively satisfy $0 \leq x \leq M-1$ and $0 \leq y \leq N-1$ in the case where the image are formed of M×N pixels arranged in a matrix, the coordinates (x, y) can locate each of the pixels forming the image. The luminance at the coordinates (x, y) on the image is referred to "pixel value".

The origin (0, 0) of the coordinates is provided on the corner of top-left of the image. The x-axis is a horizontally-extending axis, and the y-axis is a vertically-extending axis. It is to be noted that the coordinates do not necessarily have to be defined as described above; instead, the coordinates may be defined accordingly.

Here, s(x, y) denotes the luminance distribution of a blur-free image (true image or original image). Furthermore, f(x, y) denotes a PSF which defines a blur. In the above condition, the following relationship; namely Expression 1, holds if the effect of noise is is ignored:

[Math 1]

$$m(x,y) = s(x,y) * f(x,y) \quad \text{(Expression 1)}$$

Here, the sign "*" denotes convolution. The right-hand side of Expression 1 is typically given by Expression 2 as follows:

[Math 2]

$$s(x, y) * f(x, y) = \int_{-\infty}^{\infty} \int_{-\infty}^{\infty} s(i, j) f(x-i, y-j) di\, dj \quad \text{(Expression 2)}$$

In the case where the image is formed of M×N pixels, Expression 2 may be represented as Expression 3 as follows:

[Math 3]

$$s(x, y) * f(x, y) = \frac{1}{M \times N} \sum_{i=0}^{M-1} \sum_{j=0}^{N-1} s(i, j) f(x-i, y-j) \quad \text{(Expression 3)}$$

In the case where the PSF f(x, y) showing the characteristics of the blur is assumed to be known, deconvolution is performed on the image m(x, y) obtained with a camera so that the image m(x, y) is restored into the blur-free image s(x, y). In the case where the PSF f(x, y) is not assumed to be known, f(x, y) needs to be estimated from the image m(x, y) first in order to obtain the blur-free image s(x, y).

In general, the convolution of two functions is represented by the product of a Fourier transform of each of the functions. Thus, when the Fourier transforms of m(x, y), s(x, y), and f(x, y) are respectively represented as M(u, v), S(u, v), and F(u, v), Expression 4 below is given by Expression 1. It is to be noted that (u, v) is a set of coordinates in the frequency domain, and u and v respectively correspond to space frequencies in x and y directions in an actual image.

[Math 4]

$$M(u,v) = S(u,v) \bullet F(u,v) \quad \text{(Expression 4)}$$

Here, the mark "•" denotes the products of functions in the frequency domain. When Expression 4 is deformed, the following Expression 5 is obtained:

[Math 5]

$$S(u, v) = \frac{M(u, v)}{F(u, v)} \quad \text{(Expression 5)}$$

Expression 5 shows that the function obtained by dividing the Fourier transform M(u, v) of the image m(x, y) obtained by camera by the Fourier transform F(u, v) of the PSF f(x, y) corresponds to the Fourier transform S(u, v) of the true image s(x, y). In other words, S(u, v) is determined once M(u, v) and F(u, v) are obtained. M(u, v) is obtained by Fourier-transforming an image (degraded image) captured with camera. Hence, when the Fourier transform F(u, v) of a camera shake PSF f(x, y) is obtained, the degraded image can be restored through signal processing (The degraded image can be restored closely into the true image).

The camera shake PSF f(x, y) depends on a camera shake trajectory during capturing (exposure). In other words, the camera shake trajectory varies for each capturing with camera. Thus, f(x, y) varies for each capturing with camera. It is possible to estimate f(x, y) either from a single or multiple images obtained with camera or by a sensor detecting the motion of the camera (camera shake trajectory). However, f(x, y) is merely estimated or measured, and thus includes an error more or less. Hence, it is difficult to completely restore the degraded image into the true image s(x, y).

Non-Patent Literature 2 discloses that the motion blur trajectory during a short exposure time is assumed as "uniform liner motion", and approximates the Fourier transform of the PSF using a sinc function. When W is the width of the camera shake, and the camera shake appears in the x-axis direction, the denominator of Expression 5; namely F(u, v), is represented by Expression 6 as follows:

[Math 6]

$$F(u, v) = \frac{\sin(W\pi u)}{W\pi u} \quad \text{(Expression 6)}$$

The right-hand side of Expression 6 is a sinc function whose amplitude becomes 0 at a constant period. The period is the reciprocal (1/W) of the camera shake width W. It is noted that when the camera shake direction forms an angle of θ with respect to the x-axis, F(u, v) is the function of Expression 6 rotated through the angle of θ. The actual camera shake, however, draws a complex trajectory. Hence, the assumption of "uniform liner motion" might not apply in some cases.

Here, the main cause of the ringing artifacts which develop on the solid portion of the image is assumed that F(u, v); namely the denominator of Expression 5, periodically becomes zero. Thus, Patent Literatures 3 and 4 and Non-Patent Literatures 6 and 7 disclose techniques which involve opening and closing the shutter according to a coding pattern during the exposure time in capturing so that fewer F(u, v) having zero points develop. Here, the coding pattern of the shutter should be determined so that a zero point does not develop in F(u, v); that is, a PSF transformed into the frequency domain.

Hence, Non-Patent Literatures 6 and 7 disclose a technique to restore the image while varying the coding patterns of a previously known PSF in order to search for the optimal coding pattern for a specific PSF. This technique utilizes a coding pattern obtained for a specific PSF when the camera captures various scenes. Thus, a zero point could develop in F(u, v) obtained when a PSF, which is different from the PSF having a determined coding pattern, is transformed into the frequency domain. Moreover, the technique has to involve capturing and restoration for each coding pattern in order to conduct a search for a coding pattern. This inevitably increases the amount of calculations required to search for the coding pattern.

Thus, in the embodiment of the present invention described below, an imaging apparatus sequentially captures images during the exposure time. Then, the imaging apparatus obtains a first PSF showing blurs in the sequentially captured images. Furthermore, the imaging apparatus analyzes the amplitude value for the first PSF in a frequency domain, and transform the first PSF into a second PSF having no zero point in a frequency domain. The imaging apparatus performs transformation processing on each of the images based on the second PSF as obtained above, and synthesizes the transformed images. This feature makes it possible to obtain a degraded image coded with a coding pattern which adapts to the blurs. Then, the imaging apparatus restores the obtained degraded image, using the second PSF. Hence, the imaging apparatus according to the is embodiment of the present invention can generate a degraded image which is coded so that no zero points develop in the PSF, and which adapts to the blurs which develop across multiple input images. This feature can stably prevent the development of ringing artifacts while reducing an increase in processing load.

It is noted that "exposure time" in the Specification is a time period from the start to the end of sequential capturing. Furthermore, sequentially captured images are accordingly referred to as sequential images.

Detailed hereinafter is the embodiment of the present invention with reference to the drawings.

Described first is the concept of coding in the embodiment, with reference to FIG. 4. The coding, referred to as coded exposure, is processing which involves transforming the exposure information of an image, using a specific pattern (coding pattern). The coded exposure involves creating two states; one state in which light enters, and the other state in which light is blocked, and transforming the entering light into light signals which are temporally discontinuous. Here, a pattern formed in the states where the light enters and the light is blocked is referred to as coding pattern.

Considered here is the case, for example, where a camera shakes horizontally at a constant speed. When T is the exposure time and there are nine sections for forming the coding pattern, the time period for each section is T/9. Here, "1" represents the section in which the light enters, and "0" represents the section in which the light is blocked. In other words, the code "1" denotes the ON-state which shows that the light enters an imaging device. In addition, the code "0" denotes the OFF-state which shows that the light is blocked and does not enter the imaging device.

In the case where coding is not performed, (a) in FIG. 4 shows that all the codes in the sections during the exposure time are "1"(ON-state) and the coding pattern is [111111111]. Here, the imaging device receives light throughout the exposure time T.

In the case where coding is performed, the "1" and "0" of the code in each of the sections during the exposure time replace each other. Here, during the exposure time T, the imaging device receives the light only in the section whose code is "1". For example, in the case where the coding pattern is [101101110], (b) in FIG. 4 shows that the ON-state and the OFF-state switch with each other during the exposure time.

Considered here is the case where sequential images are used to perform the coding that switches the states where the light enters and the light does not enter the imaging device. Suppose the coding pattern is [101101110]; that is, the same as the example in (b) in FIG. 4. Here, (c) in FIG. 4 shows that when nine images are sequentially captured in a single exposure time, the pixel values of the second image, the fifth image, and the ninth image (hatched images) among the captured nine images are all transformed into zero, and the nine images are synthesized. In other words, among the sequentially captured images, the only images to be synthesized are those corresponding to the sections having the code "1". The synthesized image is substantially the same as the images in (b) in FIG. 4 which is obtained with the light blocked during the exposure time. In other words, the coding pattern can be changed after capturing through the change of the combination of the sequentially captured images.

Described next is how the coding affects the PSF, with reference to FIGS. 5 and 6.

Figure 5:
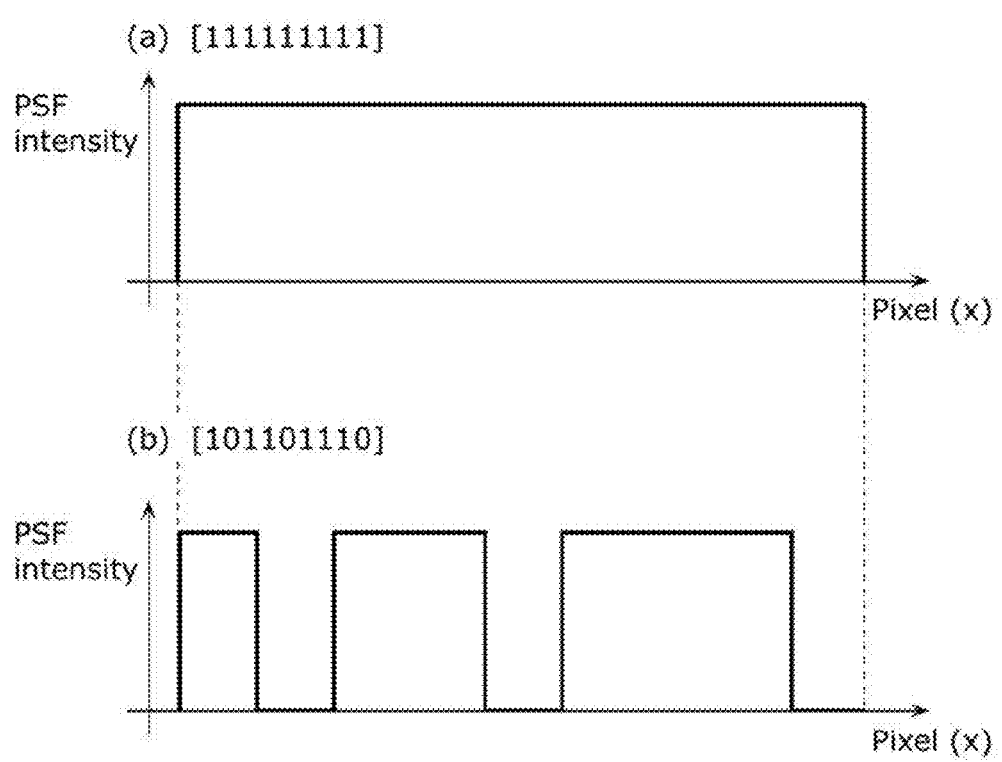
FIG. 5 schematically shows a PSF in a spatial domain.

FIG. 5 schematically shows a PSF in a spatial domain. Specifically, (a) in FIG. 5 exemplifies a PSF in the spatial domain when the coding is not performed. Furthermore, (b) in FIG. 5 exemplifies a PSF in the spatial domain when the coding is performed. It is noted that FIG. 5 illustrates a cross-section view of a PSF which is cut in the x-axis direction.

When the blur appears in the x-axis direction, the PSF is coded and transformed from the one in (a) in FIG. 5 to the one in (b) in FIG. 5.

FIG. 6 schematically shows the PSF transformed into a frequency domain. Specifically, (a) in FIG. 6 schematically shows the amplitude characteristics observed when the PSF in (a) in FIG. 5 is transformed from the spatial domain to the frequency domain. Similarly, (b) in FIG. 6 schematically shows the amplitude characteristics observed when the PSF in (b) in FIG. 6 is transformed from the spatial domain to the frequency domain. It is noted that FIG. 6 illustrates a cross-section view of a PSF which is cut in the u-axis direction.

As (a) in FIG. 6 shows, the PSF becomes a sinc function when the PSF in (a) in FIG. 5 (square wave) is transformed into the frequency domain. Thus, there is a point (zero point) where the amplitude value becomes periodically zero.

In contrast, when the PSF obtained through the coding in (b) in FIG. 5 is transformed into the frequency domain as shown in (b) in FIG. 6, the PSF has, unlike the sinc function, no point where the amplitude value becomes zero. Hence, the coding can provide the PSF whose amplitude value does not become zero in each frequency. The restoration based on such a PSF makes it possible to obtain a ringing-free restored image.

Through the above-described coded exposure, obtained is a PSF whose amplitude value does not become zero in the frequency domain. In the embodiment, the coded exposure is performed not by blocking light in capturing; instead, the coded exposure is performed by varying a pixel value in each of sequentially-captured input images, and synthesizing the input images including the varied pixel values. Specifically, the coding is performed by making each input image L-times (L is a real number between 0 and 1). Hence, in the embodiment, there is no need to perform such capturing that the light is blocked during the capturing. Accordingly, various coding patterns can be selected after the capturing.

Figure 7:
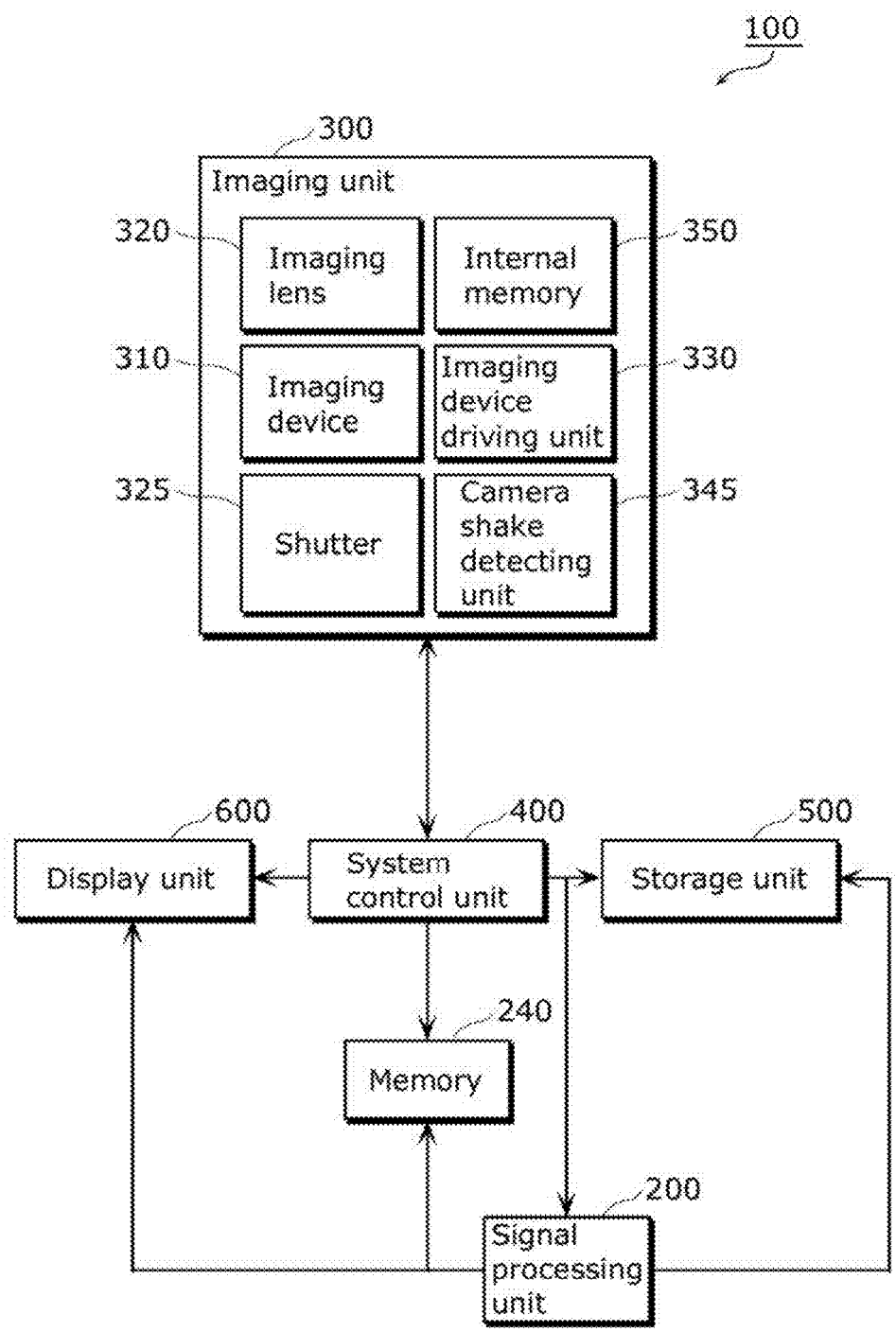
FIG. 7 depicts a block diagram showing a functional structure of an imaging apparatus according to an embodiment of the present invention.

Described next is a functional structure of the imaging apparatus according to the embodiment. FIG. 7 depicts a block diagram showing a functional structure of an imaging apparatus 100 according to the embodiment of the present invention. The imaging apparatus 100 in the embodiment is a digital electronic camera. It is noted that the imaging apparatus 100 does not necessarily have to be a digital electric camera.

As exemplified in FIG. 7, the imaging apparatus 100 includes an imaging unit 300, a signal processing unit 200 which carries out various kinds of signal processing and image restoration processing, a display unit 600 which displays an image, a storage unit 500 which stores image data, and a system control unit 400 which controls each of the units.

The imaging unit 300 sequentially captures multiple images. Specifically, the imaging unit 300 includes an imaging device (imaging sensor) 310 having multiple photo censing cells (photo diodes) arranged on the image plane, a shutter 325 which works as a diaphragm, and an imaging lens 320 which forms an image on the image plane of the imaging device 310. Moreover, the imaging unit 300 includes an internal memory 350 which temporarily stores image data consecutively provided when images are sequentially captured (in sequential capturing).

Typically, the imaging device 310 is either a charge-coupled device (CCD) sensor or a complementary metal-oxide semiconductor (CMOS) sensor.

Formed in a known structure, the imaging lens 320 is a lens unit typically including multiple lenses. Driven by a driving mechanism (not shown), the shutter 325 and the imaging lens 320 carry out operations required for optical zoom, auto exposure (AE), and auto focus (AF).

The imaging unit 300 further includes an imaging device driving unit 330 which drives the imaging device 310. The imaging device driving unit 330 is formed of a semiconductor integrated circuit such as, for example, a CCD driver. The imaging device driving unit 330 drives each imaging device 310 to read analog signals (photoelectrically converted signals) from each of the imaging devices 310 and convert the analogue signals into digital signals.

The imaging unit 300 further includes a camera shake detecting unit 345 which detects a camera shake in capturing. The camera shake detecting unit 345 is, for example, a known gyroscope and acceleration sensor. The camera shake detecting unit 345 detects the motion of the imaging apparatus 100 during the exposure time, and generates information (camera shake information) which indicates the camera shake trajectory. The generated camera shake information is provided to the signal processing unit 200, and used in processing for obtaining the first PSF to be used in the image restoration.

The signal processing unit 200 restores a degraded image. In other words, the signal processing unit 200 reduces blurs developed on an image having sequentially captured input images synthesized.

The signal processing unit 200 may carry out various kinds of signal processing such as color compensation, resolution change, and data compression. The details of the restoration of the degraded image by the signal processing unit 200 shall be described later with reference to FIG. 8.

The signal processing unit 200 is successfully provided in combination of hardware such as a known digital signal processor (DSP) and software for executing image processing.

The memory 240 is formed of a dynamic random access memory (DRAM). The memory 240 stores image data obtained from the imaging unit 300. The memory 240 temporarily stores (i) image data on which the signal processing unit 200 performs various kinds of image processing and (ii) image data compressed by the signal processing unit 200. The image data is converted into analog signals, and is displayed on the display unit 600. The image data may as well remain in digital signals, and be stored in the storage unit 500. The image data may also be transmitted to another apparatus (not shown) on wire or wirelessly via a not-shown communications apparatus.

The system control unit 400 controls the imaging unit 300, the signal processing unit 200, the memory 240, the storage unit 500, and the display unit 600. The system control unit 400 includes a not-shown central processing unit (CPU) and a flash memory.

It is noted that the imaging apparatus according to the embodiment includes known structural elements such as an optical view finder, power source (battery), and a strobe light. The description of the elements is not necessarily required to understand the present invention, and shall be omitted.

Detailed hereinafter is the structure of the signal processing unit 200 according to the embodiment with reference to FIG. 8.

Figure 8:
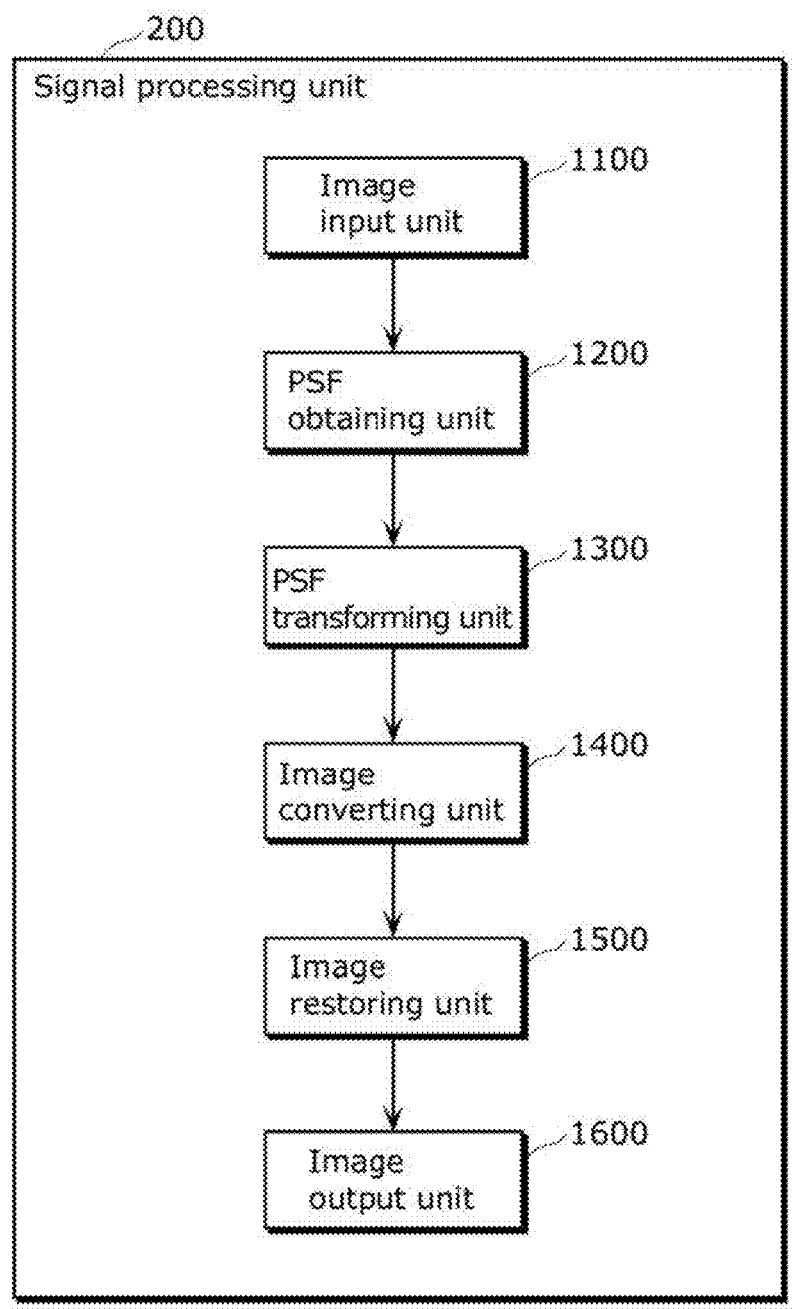
FIG. 8 depicts a block diagram showing a functional structure of a signal processing unit according to the embodiment of the present invention.

FIG. 8 depicts a block diagram showing a functional structure of the signal processing unit 200 according to the embodiment of the present invention. The signal processing unit 200 includes an image input unit 1100, a PSF obtaining unit 1200, a PSF transforming unit 1300, an image converting unit 1400, an image restoring unit 1500, and an image output unit 1600.

The image input unit 1100 obtains multiple input images sequentially captured by the imaging unit 300.

Based on information provided from sensors such as a gyro sensor and an acceleration sensor, the PSF obtaining unit 1200 obtains the first PSF showing blurs which develop across the input images obtained by the image input unit 1100. Specifically, the PSF obtaining unit 1200 calculates the first PSF based on, for example, the camera shake information detected by the camera shake detecting unit 345 when the input images are captured.

The PSF transforming unit 1300 transforms the first PSF obtained from the PSF obtaining unit 1200 into the second PSF. Specifically, the PSF transforming unit 1300 processes the first PSF to generate the second PSF. Here, the first PSF is processed so that, in the frequency domain, the amplitude value for each of the frequencies is not smaller than a threshold value. In other words, based on the first PSF, the PSF transforming unit 1300 generates the second PSF in which the amplitude value for each of the frequencies is equal to or greater than the threshold value in the frequency domain.

Based on the second PSF, the image converting unit 1400 converts the input images obtained by the image input unit 1100. Specifically, the image converting unit 1400 converts the input images into multiple converted images based on portions (i) of the second PSF and (ii) each corresponding to one of the input images.

Using the second PSF, the image restoring unit 1500 restores a to degraded image (degraded image which is coded) having the converted images synthesized in order to generate a restored image. It is noted that the image into which the multiple converted images are synthesized is obtained through addition of pixel values for each of the locations of the pixels that form each of the converted images.

The image output unit 1600 outputs the generated restored image. The image output unit 1600 outputs the restored image to, for example, at least one of the storage unit 500 and the display unit 600.

It is noted that the structure of the signal processing unit 200 shown in FIG. 8 is an example. The signal processing unit 200 may be included in another functional block. The signal processing unit 200 is successfully provided in the form of, for example, known hardware with image processing software installed.

Described next are the various kinds of processing executed by the above-structured signal processing unit 200.

Figure 9:
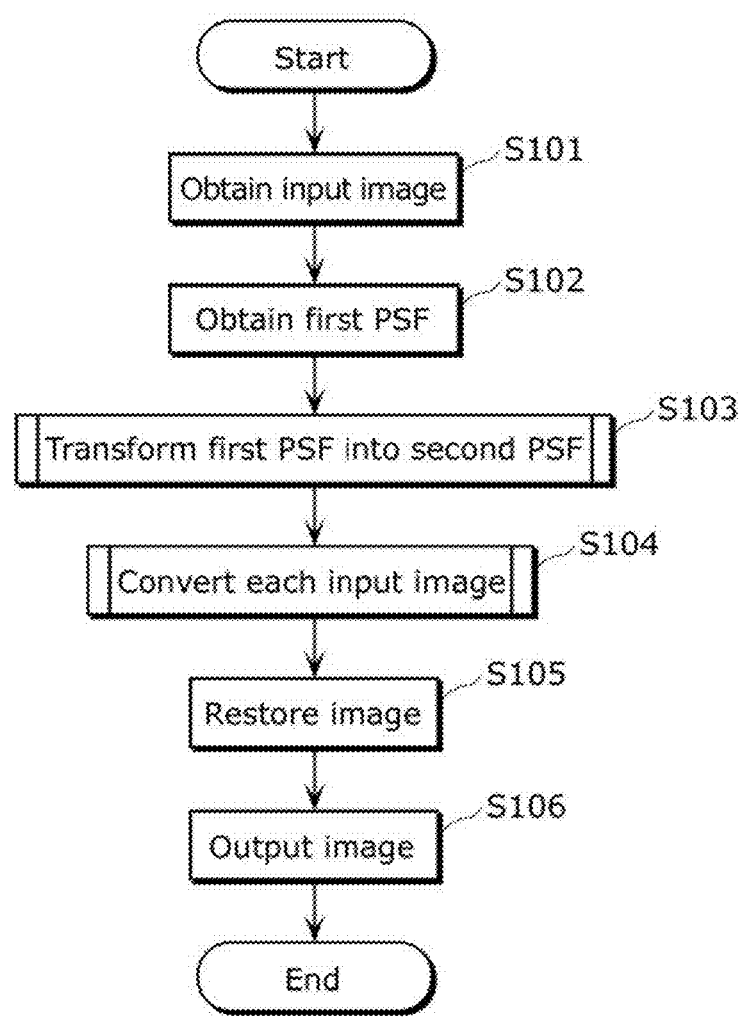
FIG. 9 depicts a flowchart showing a flow of restoration of the degraded image in the signal processing unit according to the embodiment of the present invention.
Figure 10:
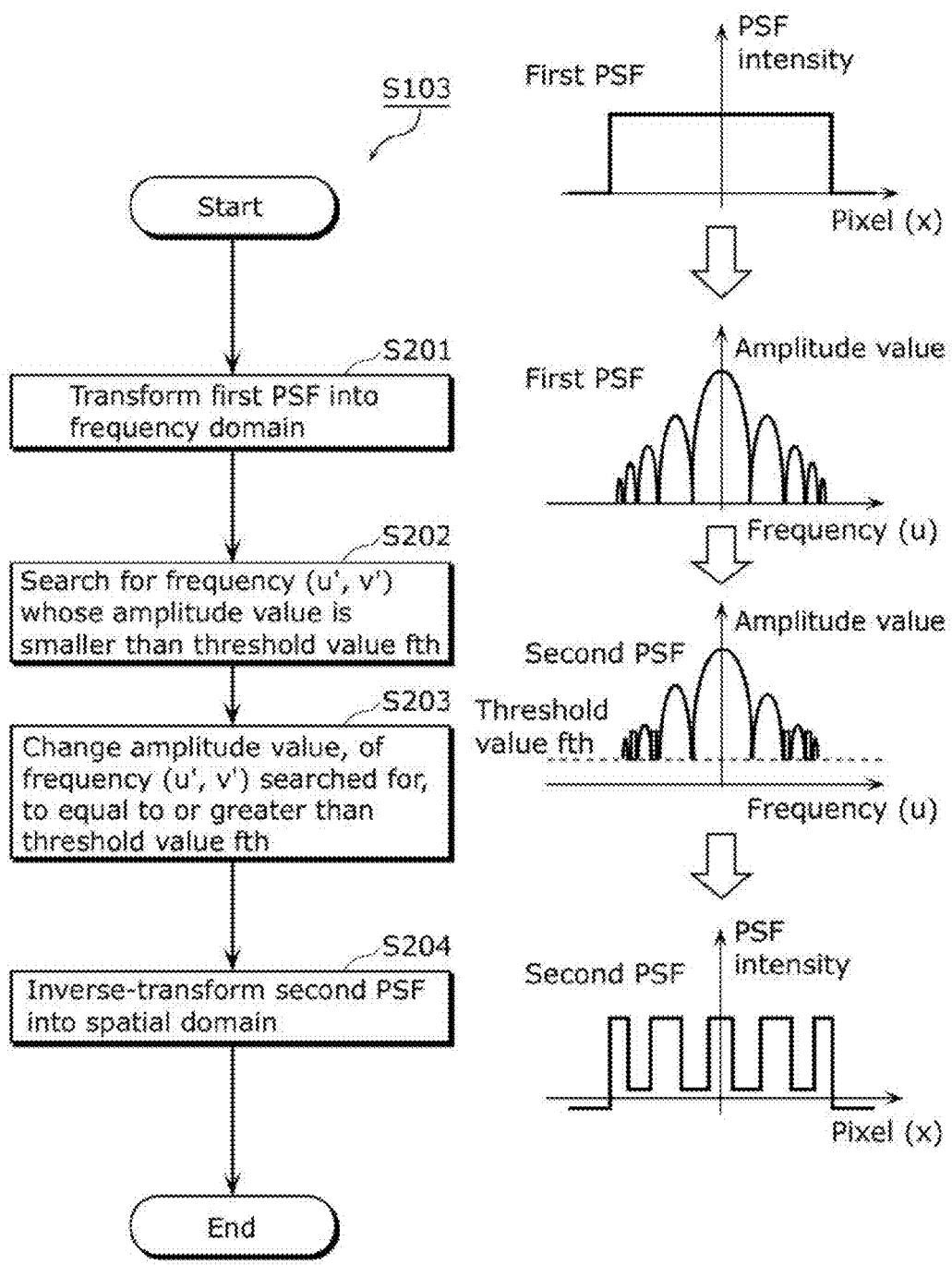
FIG. 10 depicts a flowchart showing a flow of a PSF transformation process executed by a PSF transforming unit according to the embodiment of the present invention.
Figure 11:
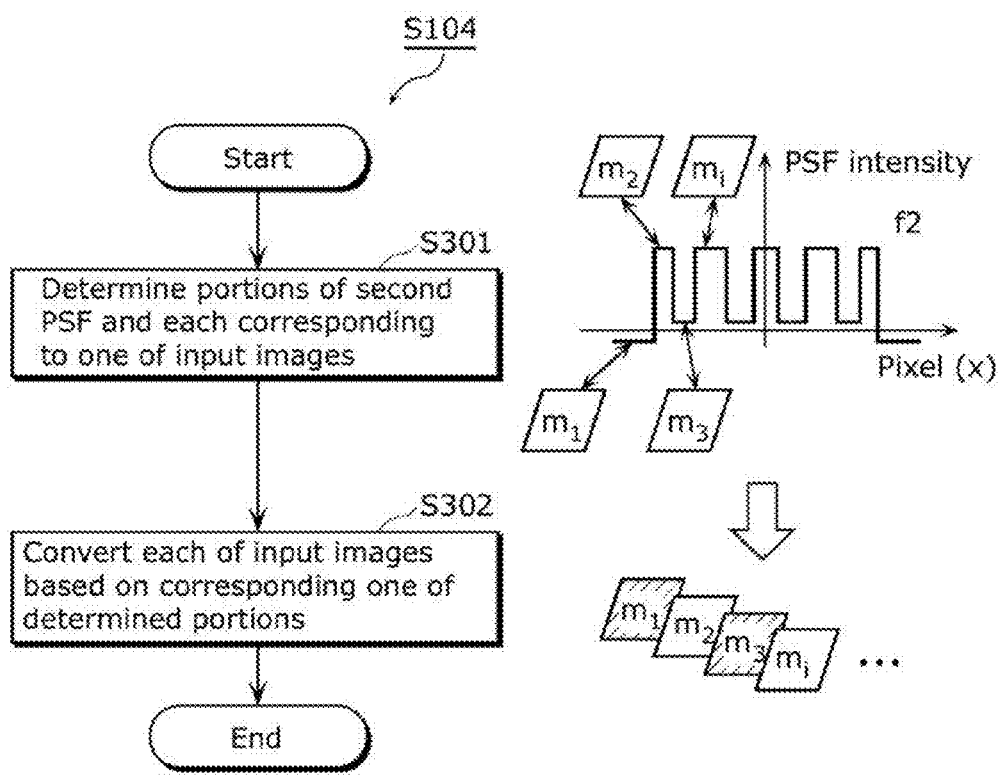
FIG. 11 depicts a flowchart showing a flow of an image transformation process executed by an image transforming unit according to the embodiment of the present invention.

FIG. 9 depicts a flowchart showing a flow of the restoration of the degraded image by the signal processing unit 200 according to the embodiment of the present invention. FIG. 10 depicts a flowchart showing a flow of a PSF transformation process executed by the PSF transforming unit 1300 according to the embodiment of the present invention. FIG. 11 depicts a flowchart showing a flow of an image transformation process executed by image converting unit 1400 according to the embodiment of the present invention.

First, the image input unit 1100 obtains multiple (n pieces: n is an integer of 2 or more) input images $m_i(x, y)$ (i is an integer from 1 to n) which are sequentially captured by the imaging unit 300 and are held in the internal memory 350 of the imaging unit 300 (S101).

Next, the PSF obtaining unit 1200 obtains camera shake information detected by the camera shake detecting unit 345 when the input images are captured. Furthermore, the PSF obtaining unit 1200 adds the pixel values of the obtained input images for each of the locations of the pixels in order to generate a degraded image. Then, based on the camera shake information and the degraded image, the PSF obtaining unit 1200 obtains the first PSF ($f1(x, y)$) showing blurs which develop across the input images.

It is noted that the PSF obtaining unit 1200 does not necessarily have to obtain the first PSF based on both of the camera shake information and the degraded image. For example, between the camera shake information and the degraded image, the PSF obtaining unit 1200 may obtain the first PSF based only on the camera shake information. It is to be noted that by obtaining the first PSF based also on a PSF calculated by the signal processing using the degraded image, the PSF obtaining unit 1200 can obtain the first PSF showing both kinds of blurs; namely, an object blur and a camera shake.

Then, the PSF transforming unit 1300 processes the first PSF to generate the second PSF (S103). Here, the first PSF is processed so that, in the frequency domain, the amplitude value for each of the frequencies does not become smaller than a threshold value. Specifically, the PSF transforming unit 1300 executes the process shown in FIG. 10.

The PSF transforming unit 1300 first transforms the first PSF, which the PSF obtaining unit 1200 obtained from the spatial domain, into the frequency domain in order to calculate an amplitude value for each frequency (S201). Here, $f1(x, y)$ denotes the first PSF in the spatial domain, and $F1(u, v)$ denotes the first PSF in the frequency domain.

Next, the PSF transforming unit 1300 specifies a frequency (u',v') whose amplitude value for the first PSF is smaller than a threshold value fth ($|F1(u, v)|<$fth) in the frequency domain (S202).

Then, the PSF transforming unit 1300 changes the amplitude value in the specified frequency to a predetermined value equal to or greater than the threshold value fth in order to generate the second PSF (S203). The second PSF to be generated is the second PSF in the frequency domain, and is denoted as $F2(u, v)$.

Finally, the PSF transforming unit 1300 inverse-transforms $F2(u, v)$ from the frequency domain into the spatial domain (S204). Here, the second PSF transformed into the spatial domain is denoted as $f2(x, y)$. The above-obtained second PSF has no zero point in the frequency domain. Thus, no ringing artifacts develop on the restored image obtained by the restoration which is based on the second PSF.

Here, the flowchart in FIG. 9 is referred again.

The image converting unit 1400 converts the input images into multiple converted images based on portions (i) of the second PSF and (ii) each corresponding to one of the input images (S104). Specifically, the image converting unit 1400 executes the process shown in FIG. 11.

First, based on the times when a blur shown by the second PSF and when each of the input images is captured, the image converting unit 1400 determines the portions of the second PSF and each temporally corresponding to one of the input images (S301). Specifically, the image converting unit 1400 determines, for example, that the portion corresponding to the input image is a pixel (a single pixel, for example) included in multiple pixels forming the second PSF and showing a blur temporally corresponding to the input image.

Then, the image converting unit 1400 converts each of the input images based on the corresponding one of the determined portions (S302). Specifically, the image converting unit 1400 converts an input images $m_i(x, y)$ into a converted image $m_i'(x, y)$ according to Expression 7 below. As shown in Expression 7, for example, the image converting unit 1400 generates each of input images by the convolution of an input image with a portion included in the second PSF and corresponding to the input image. In Expression 7, $f2_i(x, y)$ shows the portion corresponding to the input image $m_i(x, y)$ and included in the second PSF.

[Math 7]

$$m_i'(x,y)=f2_i(x,y)*m_i(x,y) \quad \text{(Expression 7)}$$

Next, the image restoring unit 1500 restores a degraded image s'(x, y) based on the second PSF in order to generate a restored image (S105). Here, the degraded image s'(x, y) is an image into which the converted images $m_i'(x, y)$ are simply synthesized. The degraded image s'(x, y) is obtained by Expression 8 below.

[Math. 8]

$$s'(x, y) = \sum_{i=1}^{n} m_i'(x, y) \quad \text{(Expression 8)}$$

The degraded image s'(x, y) is a coded image so that a zero point does not develop in the PSF.

It is to be noted that an algorithm used for the restoration and executed by the image restoring unit 1500 shall not be limited in particular. Any given typical image restoration processing may apply. The image restoring unit 1500 may execute the restoration using, for example, the known Richardson-Lucy (LR) method and Wiener filter method. Furthermore, the image restoring unit 1500 may execute the restoration using the sparse coding disclosed in Non-Patent Literature 1. Moreover, the image restoring unit 1500 may utilize Expression 9 as the simplest approach to generate a restored image r(x, y).

[Math. 9]

$$R(u, v) = \frac{S'(u, v)}{F2(u, v)} \quad \text{(Expression 9)}$$

It is noted that, in Expression 9, R(u, v) and S'(u, v) respectively represent a restored image and a coded degraded image both transformed into the frequency domain. In other words, the restored image r(x, y) is obtained through inverse-transformation of R(u, v) into the spatial domain by Expression 9.

Then, the image output unit 1600 outputs the restored image (S106). The process ends. Hence, the restored image is either stored in, for example, the storage unit 500 or displayed by the display unit 600.

Described next is the result of a restoration simulation provided as supplemental descriptions of the processing executed by the signal processing unit 200 according to the embodiment of the present invention. For the sake of convenience, the descriptions below shall be provided with reference to the drawings showing only one cross-sectional view in the x-axis or the u-axis direction.

Figure 12:
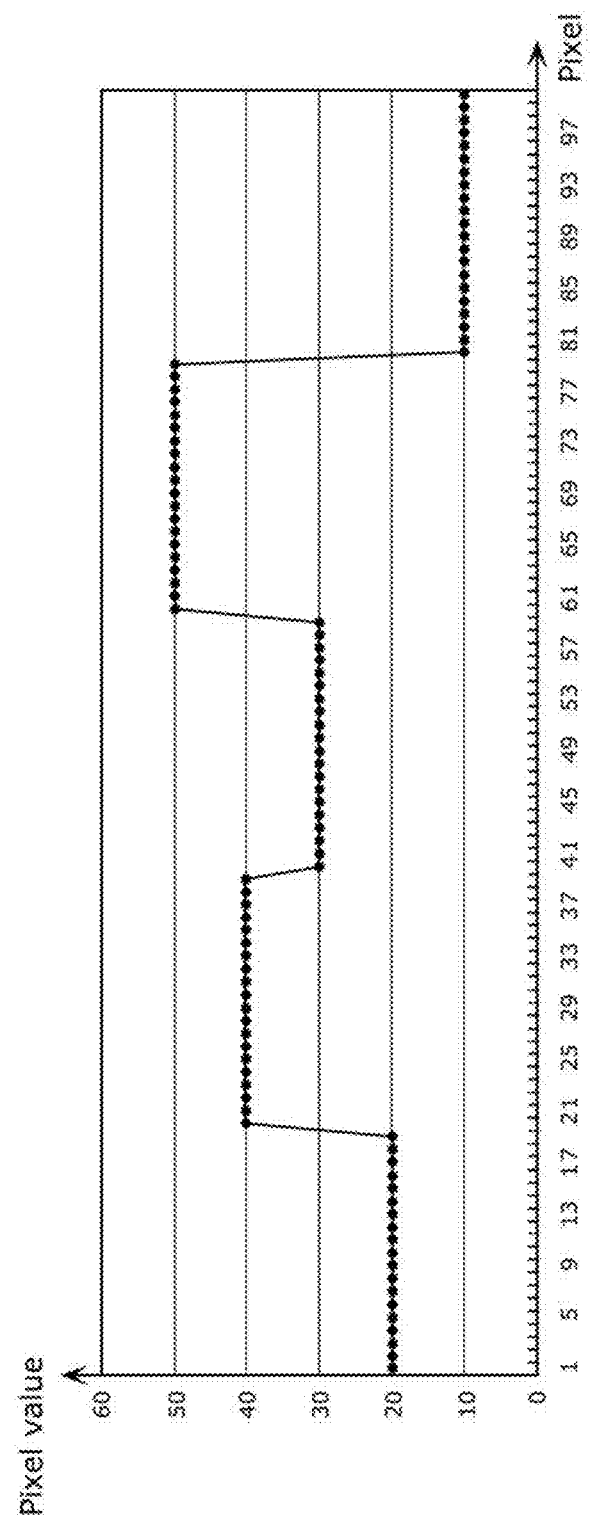
FIG. 12 shows an example of a true image.
Figure 13:
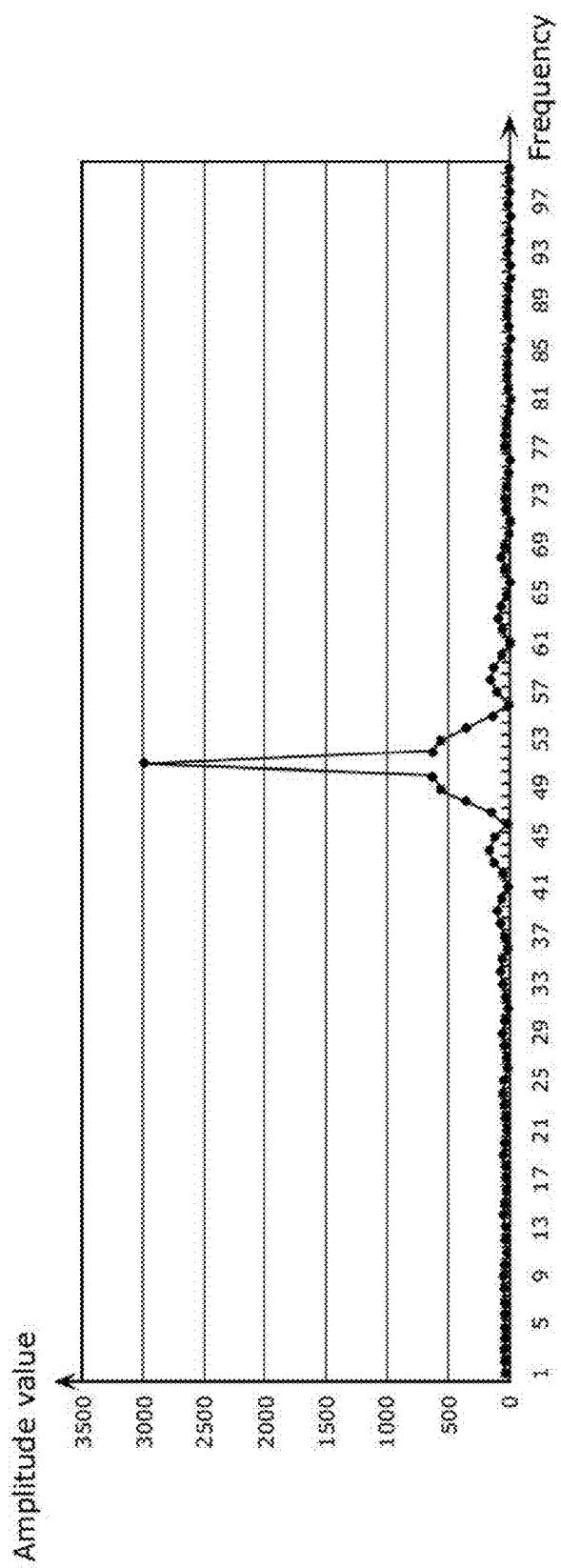
FIG. 13 shows an example of frequency characteristics of the true image.
Figure 14:
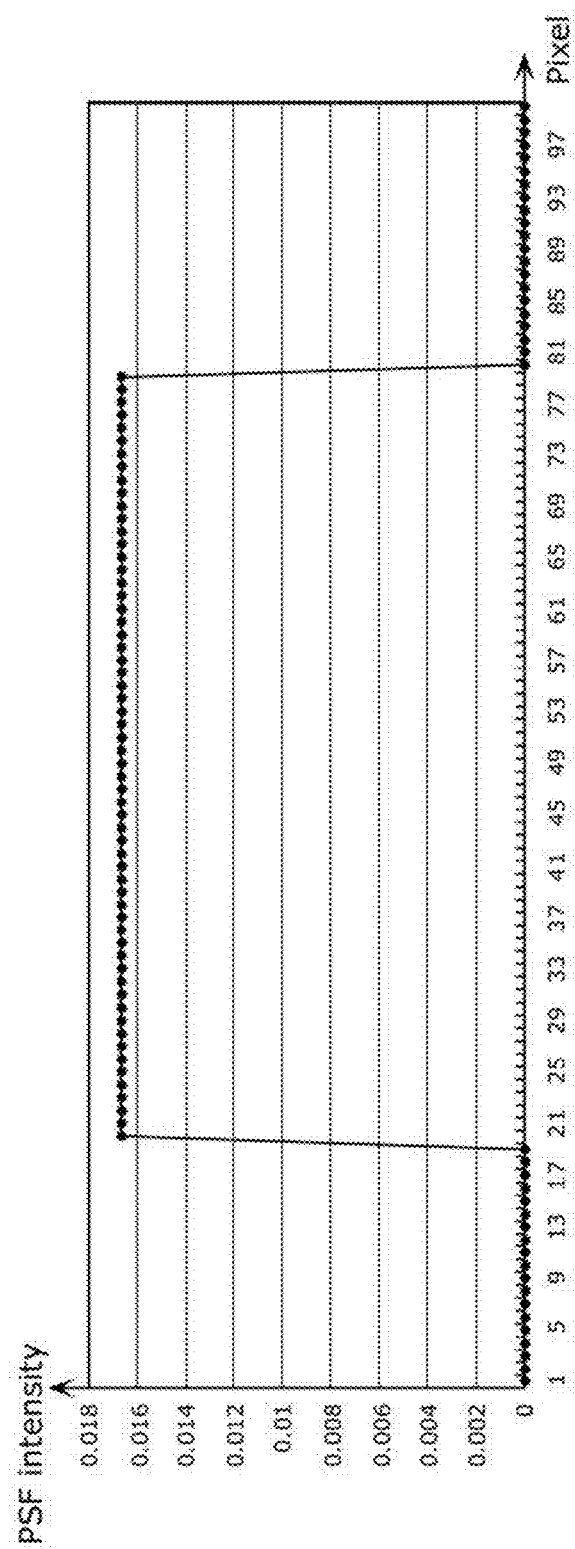
FIG. 14 shows an example of a first PSF.
Figure 15:
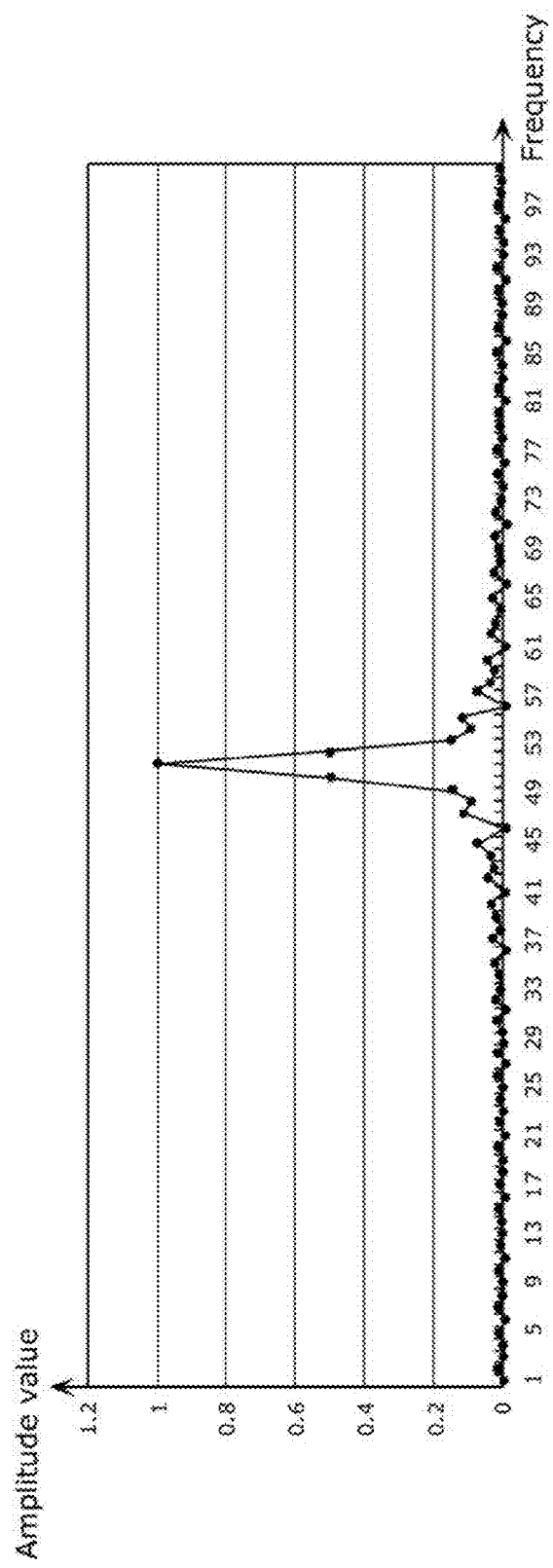
FIG. 15 shows an example of frequency characteristics of the first PSF.
Figure 16:
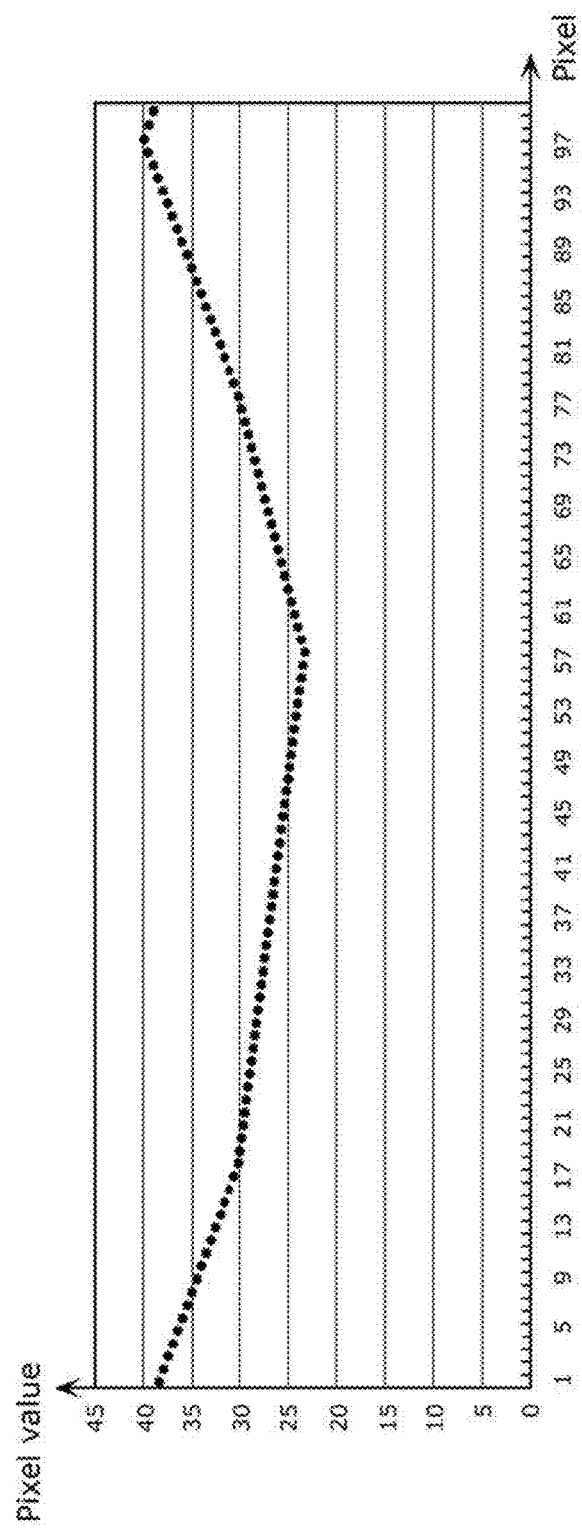
FIG. 16 shows an example of a degraded image.
Figure 17:
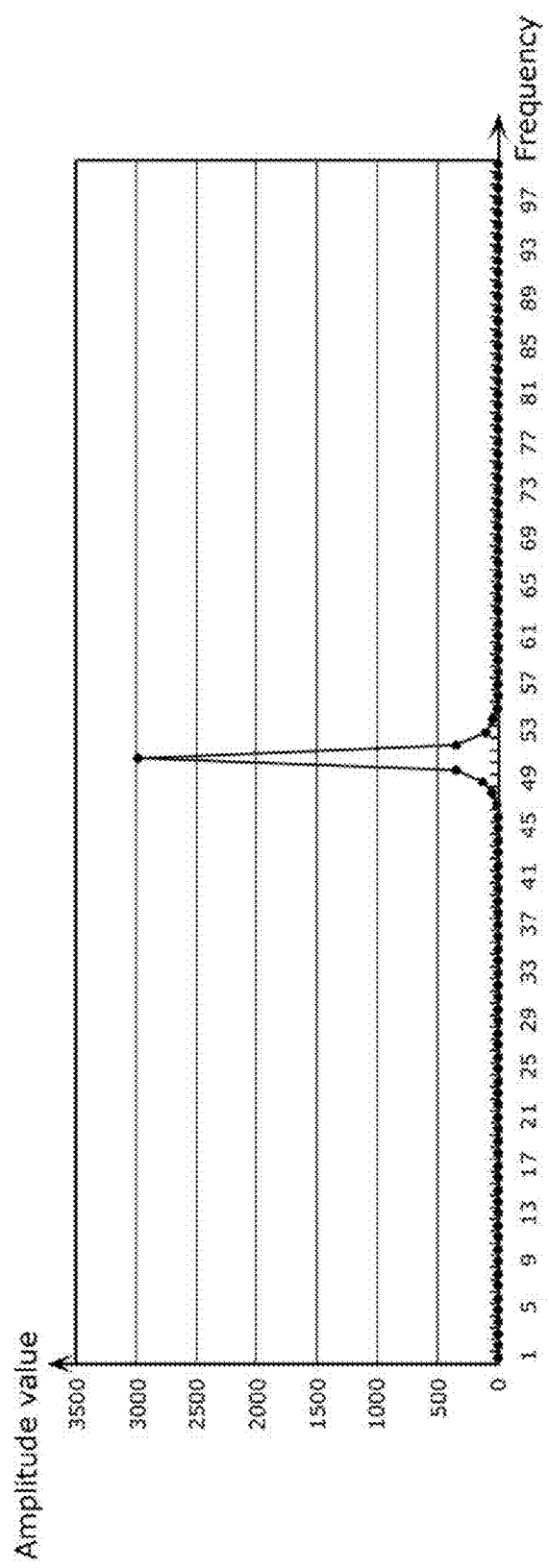
FIG. 17 shows an example of frequency characteristics of the degraded image.

FIG. 12 shows an example of a true image. FIG. 13 shows an example of frequency characteristics of the true image. FIG. 14 shows an example of the first PSF. FIG. 15 shows an example of frequency characteristics of the first PSF. FIG. 16 shows an example of a degraded image. FIG. 17 shows an example of frequency characteristics of the degraded image.

In the simulation, a signal shown in FIG. 12 was set as an image signal (true image) having no camera shake. In FIG. 12, the horizontal axis indicates pixel numbers in the x-axis direction, and the is vertical axis indicates pixel values. Moreover, the first PSF was set as shown in FIG. 14. In FIG. 14, the horizontal axis indicates pixel numbers in the x-axis direction, and the vertical axis indicates PSF intensities.

Then, the true image shown in FIG. 12 is blurred based on the first PSF shown in FIG. 14. Accordingly, obtained is a degraded image shown in FIG. 16. FIGS. 13, 15 and 17 show frequency characteristics when the images or the PSFs shown in FIGS. 12, 14, and 16 are transformed into the frequency domains. In FIGS. 13, 15 and 17, the horizontal axis indicates spatial frequencies in the u-axis direction, and the vertical axis indicates amplitude values. According to the frequency characteristics of the first PSF in FIG. 15, there are spatial frequencies whose amplitude value is zero (zero points) in the frequency domains.

Described first is the result of a simulation run by a conventional image restoration technique. The simplest image restoration technique is expressed in Expression 5. The simulation utilizes the image restoration technique in Expression 5 as the conventional image restoration technique.

Figure 18:
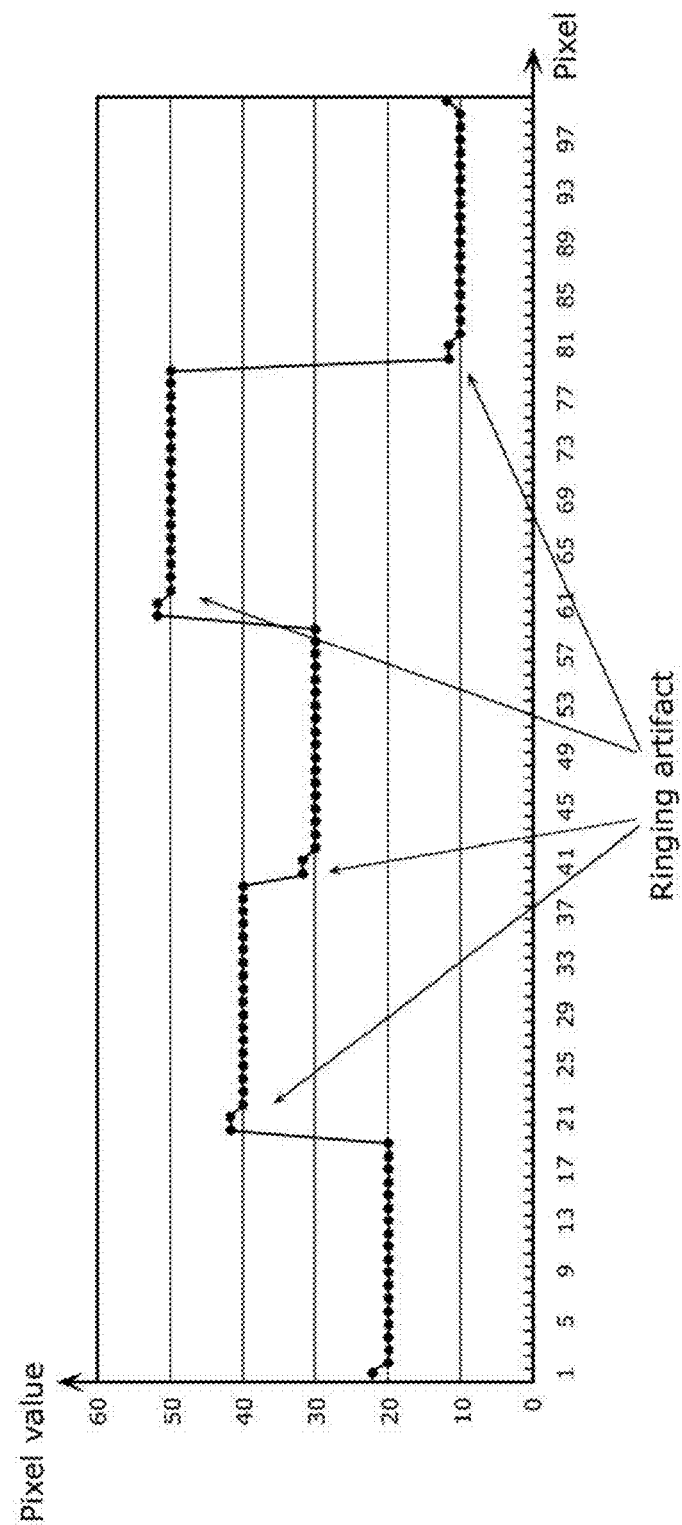
FIG. 18 shows an example of a restored image obtained by a conventional image restoration technique.

FIG. 18 shows an example of a restored image obtained by the conventional image restoration technique. The restored image shown in FIG. 18 is obtained by dividing the frequency component of the degraded image shown in FIG. 17 for each of the frequencies, using the frequency component of the first PSF in FIG. 15.

It is noted that, as shown in FIG. 15, the image includes frequencies in which the amplitude values of the first PSF become zero in the frequency domain. Thus, in the frequencies having amplitude values of zero, the division expressed in Expression 5 cannot be implemented in the image restoration technique. Hence, in the frequencies having amplitude values of zero, a constant value ("10" is the constant value in the simulation; however, the value is indefinite, and thus any given value is set depending on the implementation and the system) is used as the result of the division.

As the restored image in FIG. 18 clearly shows, the conventional image restoration technique cannot properly restore an image at a point of variation where the pixel value varies.

Described next is the result of a simulation run by the image restoration method according to the embodiment of the present invention.

Figure 19:
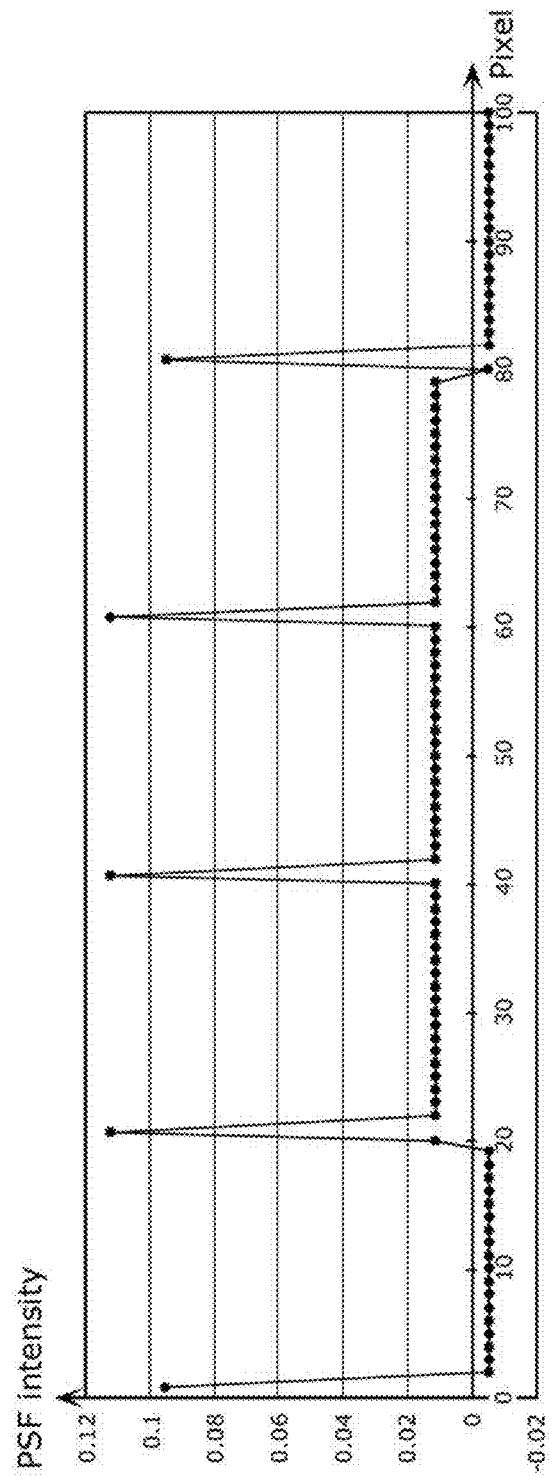
FIG. 19 shows an example of a second PSF.
Figure 20:
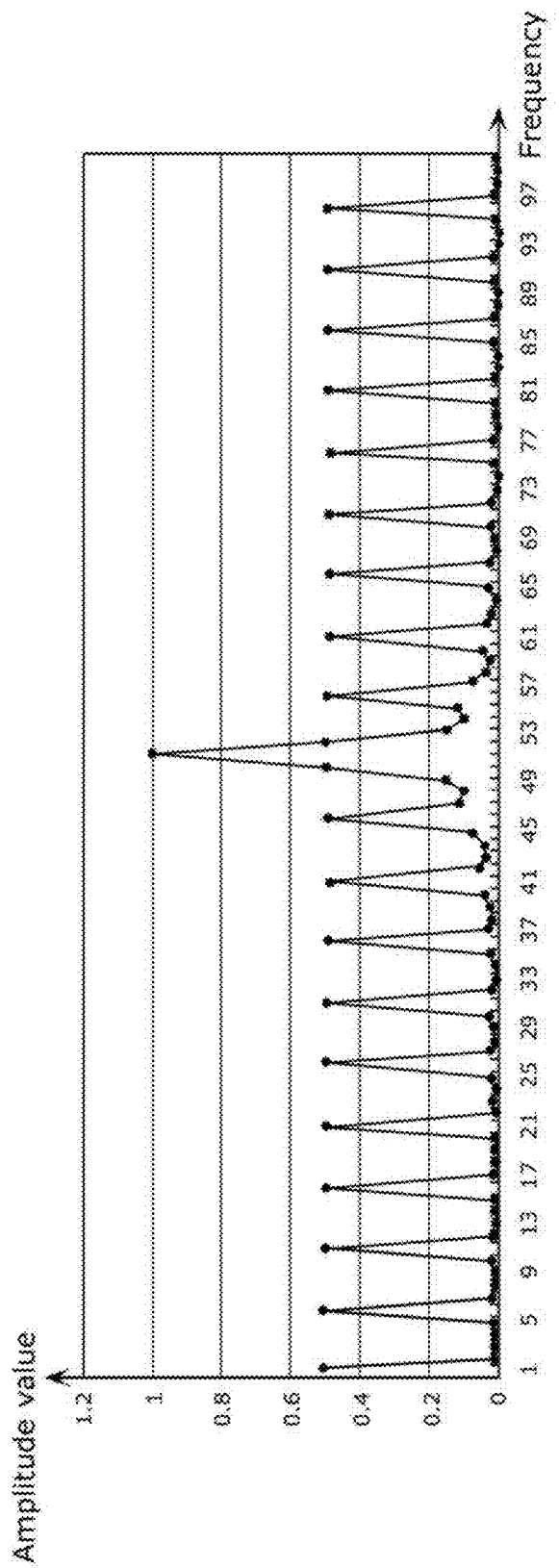
FIG. 20 shows an example of frequency characteristics of the second PSF.
Figure 21:
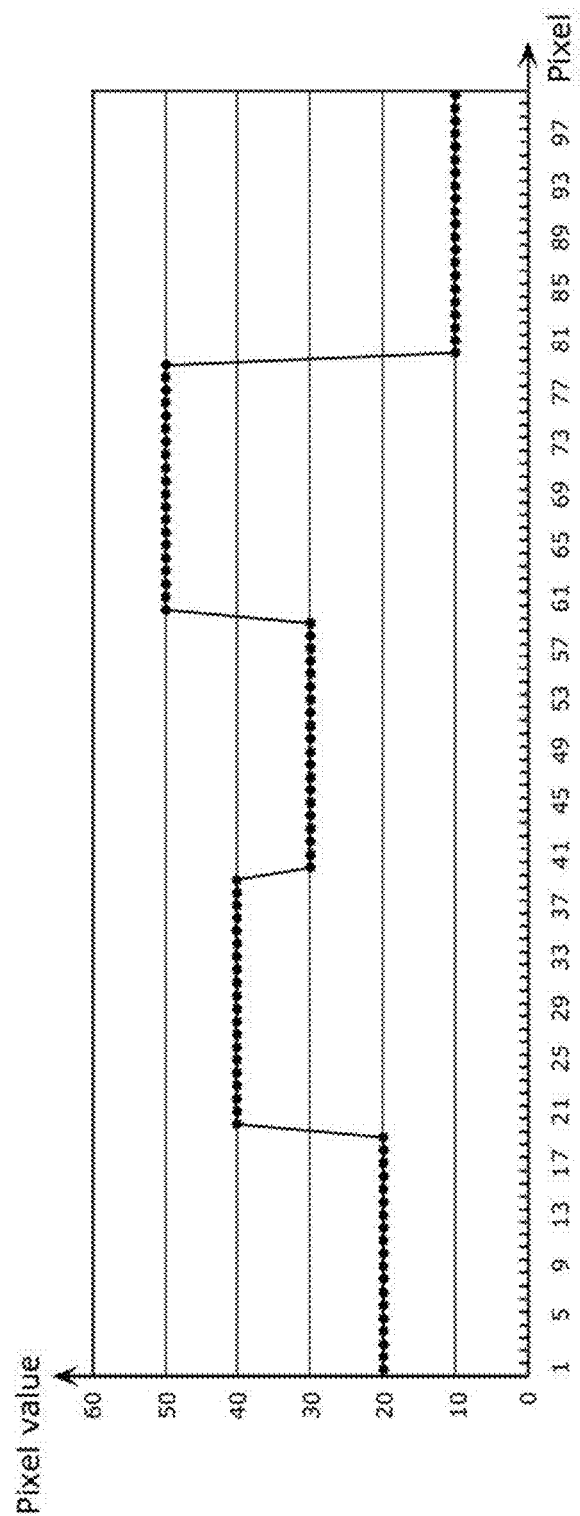
FIG. 21 shows an example of a restored image obtained by a conventional image restoration method according to the embodiment of the present invention.

FIG. 19 shows an example of the second PSF. FIG. 20 shows an example of frequency characteristics of the second PSF. FIG. 21 shows an example of a restored image obtained by the image restoration method according to the embodiment of the present invention.

First, with reference to the frequency characteristics of the first PSF shown in FIG. 15, the PSF transforming unit 1300 searches for a frequency whose amplitude value is smaller than the threshold value fth. In the simulation, the threshold value fth is set to "0.001". Then, as shown in FIG. 20, the PSF transforming unit 1300 changes the amplitude value for the frequency which is searched for to a predetermined value pv in order to calculate the second PSF. Here, the predetermined value pv is set to "0.5".

The second PSF shown in FIG. 20 is inverse-transformed from the frequency domain into the spatial domain, so that the second PSF shown in FIG. 19 is obtained.

FIG. 19 shows that, unlike in the conventional technique, the second PSF can be a negative value. Coding is carried out in "Coded Exposure Photography" shown in Patent Literatures 3 and 4, and Non-Patent Literatures 6 and 7 in order to temporarily set the value of the PSF, which is represented by 0 to 1, to 0. In other words, the PSF is whose total sum is 1 is partially set to 0 (in other words, reducing amount of light), so that the techniques disclosed in the literatures shows how not to make the amplitude value zero in the frequency domain. In the embodiment, the PSF is multiplied by real-number times. Accordingly, the ringing artifacts are eliminated, while the total sum of the PSF showing the total amount of the light remains 1.

Next, the image converting unit 1400 converts the input images into multiple converted images based on portions (i) of the second PSF shown in FIG. 19 and (ii) each corresponding to one of the input images. The converted images are synthesized into a degraded image. Such a degraded image corresponds to the degraded image obtained in coding.

Next, the image restoring unit 1500 carries out restoration based on the degraded image into which the converted images are synthesized and the second PSF shown in FIG. 19, and generates a restored image. FIG. 21 shows the restored image generated in such a manner.

As shown in FIG. 21, the restored image obtained through the image restoration method according to the embodiment is the same as the true image shown in FIG. 21. Hence, the simulation shows that the image restoration method according to the embodiment makes it possible to generate a ringing-free restored image.

It is noted that, in the above simulation, the PSF transforming unit 1300 changes the amplitude value to the predetermined value (pv=0.5) in the frequency in which the amplitude value for the first PSF in the frequency domain is smaller than a threshold value (fth=0.001); however, the threshold value fth and the predetermined value pv do not necessarily have to take such values. Since a greater predetermined value makes the amplitude value for a specific frequency greater, the PSF intensity of the second PSF in a specific frequency is amplified. An extreme example shows the chase where the PSF intensity of the second PSF is significantly amplified only in a particular frequency. Here, a coded degraded image is generated in such a manner that, among multiple input images, one specific input image has the luminance intensified and the other input images have the luminance attenuated. Even though each of the input images has no blurs, the image is dark. Thus, the excessive amplification in luminance of the input images inevitably leads to increase in noise. Accordingly, it is not preferable to excessively increase the predetermined value pv.

Moreover, a greater threshold value fth provides a greater absolute value (PSF intensity) of the second PSF in each of the pixels. As a result, the amplification amount of the pixel values increases in each input image. Thus, it is not preferable to excessively increase the threshold value fth, as well.

Hence in the embodiment, while changing the predetermined value pv and the threshold value fth, the PSF transforming unit 1300 preferably searches for the second PSF whose PSF intensity is not excessively great. Specifically, the PSF transforming unit 1300 preferably sets a provisional predetermined value pv and threshold value fth and repeats checking whether the PSF intensity of the second PSF is not excessively great, so that the PSF transforming unit 1300 can search for the predetermined value pv and the threshold value fth at which the PSF intensity of the second PSF becomes excessively great. Hence, the search for the predetermined value pv and the threshold value fth does not require the repetitive restoration based on the PSF, as shown in Non-Patent Literature 7. This feature contributes to reducing the calculation amount.

It is noted that, in the above simulation, the predetermined value pv and the threshold value fth are constant throughout all of the frequency bands; however, the predetermined value pv and the threshold value fth do not necessarily have to be constant.

The ringing artifacts are assumed to be noise which develops on the solid portion (low-frequency components) of an image. Thus, the predetermined value pv and the threshold value fth may preferably be set greater as the frequency is smaller. In other words, a predetermined value pv used for changing the amplitude value for a first frequency is preferably greater than a predetermined value pv used for changing the amplitude value for a second frequency that is higher than the first frequency. Furthermore, a threshold value fth, which is used in specifying the first frequency, is preferably greater than a threshold value fth which is used in specifying the second frequency that is higher than the first frequency. This feature contributes to efficiently reducing noise; that is ringing artifacts, which develops in the low frequency part.

In other words, the signal processing unit 200 changes the predetermined value pv depending on a frequency to make an amplitude value in the low frequency greater than that in the high frequency in a frequency whose amplitude is changed. Accordingly, the signal processing unit 200 can efficiently reduce noise; that is ringing artifacts, which develops in the low frequency domain.

Furthermore, the signal processing unit 200 can change the threshold value fth depending on a frequency, and can efficiently eliminate a small amplitude value, which causes the ringing artifacts, in the low frequency domain. Accordingly, the signal processing unit 200 can efficiently reduce noise; that is ringing artifacts, which develops in the low frequency domain.

In addition, the characteristics of an input image may be taken into consideration for setting the threshold value fth and the predetermined value pv. In the division in performing the restoration processing, as shown in Expression 5, the numerator is the frequency component of a degraded image, and the denominator is the frequency component of the second PSF. When the frequency component of the degraded image; that is the numerator, is 0, the is result of the division is 0 unless the frequency component of the second PSF; that is the denominator, is 0. Thus, in a frequency in which the amplitude value for the degraded image is set to 0 in the frequency domain, the threshold value fth and the predetermined value pv are preferably set as small as possible. This feature contributes to reducing the effect of greater noise caused by the increase in the luminance of the input image, the effect being developed by a greater threshold value fth and predetermined value pv.

It is noted that the threshold value fth and the predetermined value pv may be determined depending on the noise amount of the input image. In other words, the threshold value fth and the predetermined value pv may be determined by the S/N ratio of the input image. Specifically, the threshold value fth and the predetermined value pv are preferably determined smaller as the noise which appears in the input image is greater.

For example, the PSF transforming unit 1300 may store the combination of the threshold value fth and the predetermined value pv, both of the values corresponding to the brightness of the capturing scene. Then, the PSF transforming unit 1300 may read from the memory the combination of the threshold value fth and the predetermined value pv corresponding to the brightness measured when the input image is captured, and may determine the threshold value fth and the predetermined value pv. In general, the brighter the capturing scene is, the smaller the noise is.

It is noted that, instead of the brightness of the capturing scene, the PSF transforming unit 1300 may use the capturing condition (ISO speed, for example) or the S/N ratio of the input image to determine the threshold value fth and the predetermined value pv.

Hence, since the threshold value fth and the predetermined value pv are determined smaller as the noise which develops on the input image is greater, the signal processing unit 200 successfully reduces the problem of increasing noise on the restored image caused by the change in amplitude value.

As described above, the imaging apparatus 100 according to the embodiment processes the first PSF showing blurs which develop across input images to generate the second PSF in which the amplitude value for each of the frequencies is equal to or greater than a threshold value in the frequency domain. Then, the imaging apparatus 100 converts each of the input images based on each portion of the second PSF. The converted input images are synthesized into an image. Such a synthesized image corresponds to a degraded image which is coded so that no zero points develop in the PSF. In other words, the imaging apparatus 100 can generate a degraded image which is coded so that no zero points develop in the PSF, and which adapts to the blurs that develop across the input images. Accordingly, the imaging apparatus 100 does not have to determine a coding pattern in advance. This feature contributes to stably preventing the development of the ringing artifacts. Furthermore, the imaging apparatus 100 does not have to repeat restoration processing for generating the degraded image which is coded so that no zero points develop in the PSF. Thus, the imaging apparatus 100 can also reduce the increase in processing load.

Moreover, the imaging apparatus 100 according to the embodiment changes an amplitude value to generate the second PSF. Here, the amplitude value is changed in a frequency in which the amplitude value for the first PSF is smaller than a threshold value. Thus, the imaging apparatus 100 can generate a coded degraded image which further adapts to the blurs that develop across the input images. In other words, the imaging apparatus 100 successfully generates a restored image having fewer blurs.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

In the embodiment, for example, the PSF transforming unit 1300 changes the amplitude value for the first PSF to a predetermined value in order to generate the second PSF. Instead, the PSF transforming unit 1300 may generate the second PSF by another technique. Specifically, for example, the PSF transforming unit 1300 may generate the second PSF by generating an offset PSF in which the amplitude value for a specific frequency is equal to or greater than a threshold value and adding the offset PSF to the first PSF in the frequency domain. The offset PSF is a function satisfying, for example, that only the amplitude value for the specific frequency is a certain value equal to or greater than a threshold value and that an amplitude value for the other frequency values is zero.

Moreover, in the embodiment, the PSF transforming unit 1300 changes the amplitude value only in the frequency in which the amplitude value for the first PSF is smaller than a threshold value; instead, the PSF transforming unit 1300 may change the amplitude value in a frequency in which the amplitude value for the first PSF is equal to or greater than a threshold value. For example, the PSF transforming unit 1300 may change the amplitude value near a frequency in which the amplitude value for the first PSF is smaller than a threshold value, so that the amplitude value changes smoothly.

Moreover, the present invention may be provided in a form of an image restoration apparatus including characteristic processing units that the signal processing unit 200 has. Specifically, an image restoration apparatus 10 may be structured as shown in FIG. 22, for example.

Figure 22:
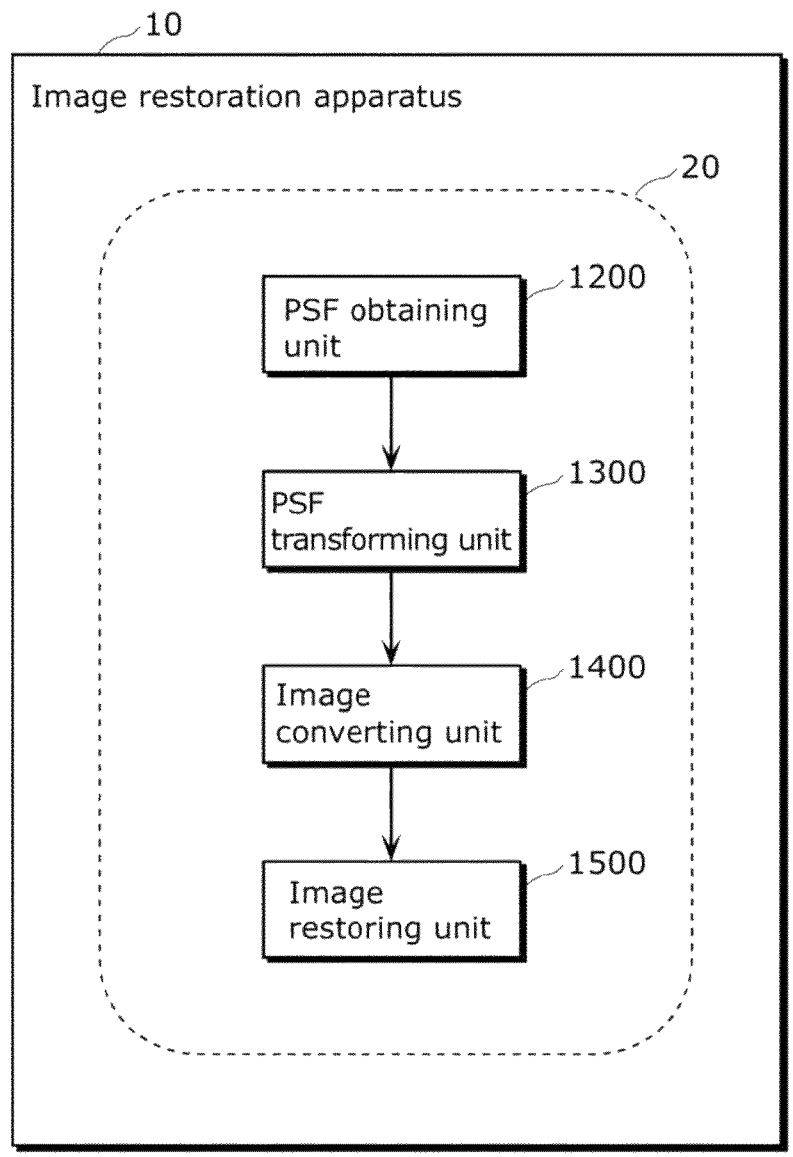
FIG. 22 depicts a block diagram showing a functional structure of the image restoration apparatus according to an implementation of the present invention.

FIG. 22 depicts a block diagram showing a functional structure of the image restoration apparatus 10 according to an implementation of the present invention. The image restoration apparatus 10 shown in FIG. 22 includes the PSF obtaining unit 1200, the PSF transforming unit 1300, the image converting unit 1400, and the image restoring unit 1500. Similar to the signal processing unit 200, the image restoration apparatus 10 can generate, based on sequentially captured multiple input images, a degraded image which adapts to the blurs that develop across multiple input images. The degraded image is coded so that no zero points develop in the PSF. Accordingly, the image restoration apparatus 10 can stably prevents the development of ringing artifacts while reducing an increase in processing load.

A part or all of the constituent elements constituting the image restoration apparatus 10 in FIG. 22 may be configured from a single System-LSI (Large-Scale Integration). For example, the image restoration apparatus 10 may be configured from a system LSI 20 including the PSF obtaining unit 1200, the PSF transforming unit 1300, the image converting unit 1400, and the image restoring unit 1500.

The system LSI 20 is a super-multi-function LSI manufactured by integrating constituent units on one chip, and is specifically a computer system configured by including a microprocessor, read only memory (ROM), RAM, or by means of a similar device. The RAM has a computer program stored. The System-LSI performs its functions through the microprocessor's operation according to the computer program.

Here, system-LSI is mentioned but there are instances where, due to a difference in the degree of integration, the designations IC, LSI, super LSI, and ultra LSI are used. Furthermore, the means for circuit integration is not limited to the LSI, and implementation in the form of a dedicated circuit or a general-purpose processor is also available. In addition, it is also acceptable to use a Field Programmable Gate Array (FPGA) that is programmable after the LSI has been, manufactured, and a reconfigurable processor in which connections and settings of circuit cells within the LSI are reconfigurable.

Furthermore, if an integrated circuit technology that replaces the LSI appears thorough the progress in the semiconductor technology or an other derived technology, that technology can naturally be used to carry out integration of the constituent elements. Biotechnology can be applied to the integrated circuit technology.

Moreover, instead of being provided as an image restoration apparatus including such characteristics processing units, the present invention may be provided as an image restoration method including the characteristic processing units included in the image restoration apparatus as steps. In addition, the present invention may be implemented as a computer program causing a computer to execute each of the characteristic steps included in the image restoration method. As a matter of course, such a computer program may be distributed via a computer-readable storage medium such as a compact disc read only memory (CD-ROM), and a communications network such as the Internet.

INDUSTRIAL APPLICABILITY

An image restoration apparatus according to an implementation of the present invention successfully generate an image having fewer blurs, even though a camera shake occurs during the image capturing and the object moves. Such image restoration apparatus may be useful for digital cameras, movies, and surveillance cameras.

REFERENCE SIGNS LIST

10 Image restoration apparatus
20 System LSI
100 Imaging apparatus
200 Signal processing unit
240 Memory
300 Imaging unit
310 Imaging device
320 Imaging lens
325 Shutter
330 Imaging device driving unit
345 Camera shake detecting unit
350 Internal memory
500 Storage unit
600 Display unit 1100 Image input unit
1200 PSF obtaining unit
1300 PSF transforming unit
1400 Image input unit
1500 Image restoring unit
1600 Image output unit

The invention claimed is:

1. An image restoration apparatus for reducing a blur developed in an image generated by synthesizing a plurality of input images that are sequentially captured, said image restoration apparatus comprising:
   a PSF obtaining unit configured to obtain a first Point Spread Function (PSF) showing blurs which develop across the input images;
   a PSF transforming unit configured to process the first PSF to generate a second PSF, the processing being executed so that, in a frequency domain, an amplitude value for each of frequencies is not smaller than a threshold value;
   an image converting unit configured to convert the input images into a plurality of converted images based on portions (i) of the second PSF and (ii) each corresponding to one of the input images; and
   an image restoring unit configured to restore a degraded image, into which the converted images are synthesized, to generate a restored image, the restoration being executed based on the second PSF.

2. The image restoration apparatus according to claim 1, wherein said PSF transforming unit is configured to process the first PSF by specifying a frequency at which an amplitude value for the first PSF is smaller than the threshold value in the frequency domain, and changing at the specified frequency the amplitude value to a predetermined value equal to or greater than the threshold value.

3. The image restoration apparatus according to claim 2, wherein the predetermined value used for changing an amplitude value for a first frequency is greater than the predetermined value used for changing an amplitude value for a second frequency which is higher than the first frequency.

4. The image restoration apparatus according to claim 2, wherein the predetermined value is determined to be smaller as noise appearing in the input images is greater.

5. The image restoration apparatus according to claim 2, wherein the threshold value used for specifying a first frequency is greater than the threshold value used for specifying a second frequency which is higher than the first frequency.

6. The image restoration apparatus according to claim 2, wherein the threshold value is determined to be smaller as noise appearing in the input images is greater.

7. The image restoration apparatus according to claim 1, wherein said image converting unit is configured to determine portions (i) of the second PSF and (ii) each temporally corresponding to one of the input images, based on times when a blur shown by the second PSF is detected and when each of the input images is captured, and to convert each of the input images based on the corresponding one of the determined portions.

8. The image restoration apparatus according to claim 1, wherein said PSF transforming unit is configured to generate the second PSF by specifying a frequency in which an amplitude value for the first PSF is smaller than the threshold value in the frequency domain, generating an offset PSF in which the specified amplitude value for the frequency is equal to or greater than the threshold value, and adding the offset PSF to the first PSF.

9. An integrated circuit for reducing a blur developed in an image generated by synthesizing a plurality of input images that are sequentially captured, said circuit comprising:
   a PSF obtaining unit configured to obtain a first Point Spread Function (PSF) showing blurs which develop across the input images;
   a PSF transforming unit configured to process the first PSF to generate a second PSF, the processing being executed so that, in a frequency domain, an amplitude value for each of frequencies is not smaller than a threshold value;
   an image converting unit configured to convert the input images into a plurality of converted images based on portions (i) of the second PSF and (ii) each corresponding to one of the input images; and
   an image restoring unit configured to restore a degraded image, into which the converted images are synthesized, to generate a restored image, the restoration being executed based on the second PSF.

10. An image restoration method for reducing a blur developed in an image generated by synthesizing a plurality of input images that are sequentially captured, said image restoration method comprising:
   obtaining a first Point Spread Function (PSF) showing blurs which develop across the input images;
   processing, the first PSF to generate a second PSF, said processing being executed so that, in a frequency domain, an amplitude value for each of frequencies is not smaller than a threshold value;
   converting the input images into a plurality of converted images based on portions (i) of the second PSF and (ii) each corresponding to one of the input images; and
   restoring a degraded image, into which the converted images are synthesized, to generate a restored image, said restoring being executed based on the second PSF.

11. A non-transitory computer-readable recording medium for use in a computer, said recording medium having a computer program thereon for causing the computer to execute said image restoration method according to claim 10.

* * * * *